(12) United States Patent
Liao et al.

(10) Patent No.: US 12,304,846 B2
(45) Date of Patent: May 20, 2025

(54) SEWAGE TREATMENT APPARATUS SUITABLE FOR MULTI-HOUSEHOLD DOMESTIC SEWAGE TREATMENT

(71) Applicant: HUNAN WISDOM WATER ENVIRONMENTAL ENGINEERING CO., LTD., Changsha (CN)

(72) Inventors: Wenyun Liao, Changsha (CN); Mingjie Jiang, Changsha (CN); Shuang Liu, Changsha (CN); Dong Zhou, Changsha (CN); Guangming Chen, Changsha (CN)

(73) Assignee: HUNAN WISDOM WATER ENVIRONMENTAL ENGINEERING CO., LTD., Changsha (CN)

( * ) Notice: Subject to any disclaimer, the term of this patent is extended or adjusted under 35 U.S.C. 154(b) by 1000 days.

(21) Appl. No.: 17/418,723

(22) PCT Filed: Dec. 23, 2019

(86) PCT No.: PCT/CN2019/127393
§ 371 (c)(1),
(2) Date: Jun. 25, 2021

(87) PCT Pub. No.: WO2020/135323
PCT Pub. Date: Jul. 2, 2020

(65) Prior Publication Data
US 2022/0055929 A1    Feb. 24, 2022

(30) Foreign Application Priority Data
Dec. 25, 2018    (CN) .......................... 201811594427.3

(51) Int. Cl.
*C02F 3/30*    (2023.01)
*B01D 53/04*    (2006.01)
(Continued)

(52) U.S. Cl.
CPC ............ *C02F 3/30* (2013.01); *B01D 53/0438* (2013.01); *C02F 1/28* (2013.01); *C02F 1/68* (2013.01);
(Continued)

(58) Field of Classification Search
None
See application file for complete search history.

(56) References Cited

U.S. PATENT DOCUMENTS 6,200,470 B1 * 3/2001 Romero ................ C02F 3/1242
                                                          210/519
10,501,357 B1 * 12/2019 McKinney ............. B01D 21/02
(Continued)

FOREIGN PATENT DOCUMENTS

CN        1422817 A     6/2003
CN      106630411 A     5/2017
(Continued)

OTHER PUBLICATIONS

International Search Report of PCT/CN2019/127393 dated Mar. 17, 2020.

*Primary Examiner* — Chester T Barry
(74) *Attorney, Agent, or Firm* — Calfee, Halter & Griswold LLP

(57) ABSTRACT

A sewage treatment apparatus comprises an external box body internally being provided with an anaerobic zone, an aerobic zone, a settling zone, a sludge reduction zone and an apparatus zone separated from each other, wherein the anaerobic zone, the aerobic zone, the settling zone and the sludge reduction zone communicate in sequence, the anaerobic zone communicates with a septic tank, the aerobic zone communicates with the anaerobic zone to reflux a part of mixed liquor to the anaerobic zone, the settling zone communicates with the anaerobic zone to reflux a part of active sludge to the anaerobic zone, and the sludge reduction zone (Continued)

communicates with the anaerobic zone or the septic tank; and the apparatus zone is internally provided with a detection unit for detecting various parameters during a sewage treatment process and a controller for controlling working states according to a detection result of the detection unit.

9 Claims, 4 Drawing Sheets

(51) Int. Cl.
*C02F 1/28* (2023.01)
*C02F 1/68* (2023.01)
*C02F 3/00* (2023.01)
*C02F 9/00* (2023.01)
*C02F 11/00* (2006.01)
*C02F 1/00* (2023.01)
*C02F 101/10* (2006.01)
*C02F 101/30* (2006.01)

(52) U.S. Cl.
CPC .............. *C02F 3/006* (2013.01); *C02F 9/00* (2013.01); *C02F 11/00* (2013.01); *C02F 2001/007* (2013.01); *C02F 2101/105* (2013.01); *C02F 2101/30* (2013.01); *C02F 2203/006* (2013.01); *C02F 2209/04* (2013.01); *C02F 2209/08* (2013.01); *C02F 2209/16* (2013.01); *C02F 2209/18* (2013.01); *C02F 2209/22* (2013.01); *C02F 2303/02* (2013.01); *C02F 2303/04* (2013.01)

(56) References Cited

U.S. PATENT DOCUMENTS

| 2005/0045557 | A1* | 3/2005 | Daigger | C02F 3/1215 |
| | | | | 210/605 |
| 2005/0274669 | A1* | 12/2005 | Marchesseault | C02F 3/1273 |
| | | | | 210/748.11 |
| 2007/0187329 | A1* | 8/2007 | Moller | C02F 1/288 |
| | | | | 210/681 |
| 2010/0072130 | A1* | 3/2010 | Fane | C02F 3/1273 |
| | | | | 210/295 |
| 2017/0081225 | A1* | 3/2017 | Yeh | A01G 9/14 |
| 2020/0330902 | A1* | 10/2020 | Zhu | C02F 3/085 |
| 2022/0055929 | A1* | 2/2022 | Liao | C02F 3/006 |

FOREIGN PATENT DOCUMENTS

| CN | 206457381 U | 9/2017 |
| CN | 206457387 U | 9/2017 |
| CN | 207175705 U | 4/2018 |
| CN | 109467283 A | 3/2019 |
| JP | 2012200705 A | 10/2012 |
| KR | 101368295 B1 | 2/2014 |

* cited by examiner

SEWAGE TREATMENT APPARATUS SUITABLE FOR MULTI-HOUSEHOLD DOMESTIC SEWAGE TREATMENT

CROSS-REFERENCE TO RELATED APPLICATIONS

This application is a national stage application, filed under 35 U.S.C. § 371, of PCT Application No. PCT/CN2019/127393 filed on Dec. 23, 2019, which claims priority to Chinese Application No. 201811594427.3 filed on Dec. 25, 2018, the contents of which are hereby incorporated by reference as if recited in their entirety.

TECHNICAL FIELD

The present invention relates to the technical field of sewage treatment apparatuses, in particular to a sewage treatment apparatus suitable for multi-household domestic sewage treatment.

BACKGROUND

In recent years, processes of industrialization and urbanization are accelerated, the vigor for industrial distribution and economic structural adjustment is increased, it is weak to monitor the living environment, policies are lagged behind relatively, and industrial pollution and urban living pollution are increased rapidly. Although there is a multi-household sewage treatment apparatus mounting scheme in the current market as far as areas which cannot be covered by a municipal sewage collecting pipe network are concerned, the multi-household sewage treatment apparatus mounting scheme has the problems of large size, low effluent index control rate and poor generalization performance, and it is, in fact, hard to treat multi-household sewage comprehensively. In addition, an existing multi-household sewage treatment apparatus cannot be adjusted automatically according to detection of effluent quality and the effluent quality of the sewage treatment apparatus is unstable.

SUMMARY

The present invention provides a sewage treatment apparatus suitable for multi-household domestic sewage treatment to solve the technical problem that an existing multi-household sewage treatment apparatus cannot be adjusted automatically according to detection of effluent quality and the effluent quality of the sewage treatment apparatus is unstable.

According to one aspect of the present invention, a sewage treatment apparatus suitable for multi-household domestic sewage treatment is provided for integrated treatment of household sewage discharged by a plurality of residences, wherein the sewage treatment apparatus comprises an external box body, the external box body internally being provided with an anaerobic zone, an aerobic zone, a settling zone, a sludge reduction zone and an apparatus zone separated from each other;

the anaerobic zone, the aerobic zone, the settling zone and the sludge reduction zone communicate in sequence, the anaerobic zone communicates with a septic tank, the aerobic zone communicates with the anaerobic zone to reflux a part of mixed liquor to the anaerobic zone, the settling zone communicates with the anaerobic zone to reflux a part of active sludge to the anaerobic zone, and the sludge reduction zone communicates with the anaerobic zone or the septic tank; and the apparatus zone is internally provided with a detection unit for detecting various parameters during a sewage treatment process and a controller for controlling working states of various sewage treatment devices of the sewage treatment apparatus according to a detection result of the detection unit, and the sewage treatment device comprises one or more of: a fan, a lifting pump, a chemical reagent adding device, a physical phosphorus removal device, a chemical phosphorus removal device, a mixed liquor reflux pump, a second electric control switch element and a carbon source supplementing device.

Further, the settling zone is provided with a water advanced treatment device including a box body, an upper portion of the box body being provided with a water inlet and a water outlet; and the box body is internally provided with a vertical flow settling assembly for guiding a fluid vertically introduced from the water inlet and outputting the fluid in an ejecting manner by way of inclined wall deflection and an inclined tube settling assembly or a sloping plate settling assembly arranged in an output position of the vertical flow settling assembly and used for settling the fluid output by the vertical flow settling assembly in an inclined settling manner.

Further, the external box body is further internally provided with a disinfection and sterilization zone communicating with the settling zone and used for further disinfecting and sterilizing clean water discharged by the settling zone.

Further, the sludge reduction zone is provided with a sludge reduction device including:
an aerating unit for enabling active sludge composed of microorganisms to be mixed and contacted with organic pollutants in sewage by aeration to enable degradation of the organic pollutants;
a cell wall breaking unit for accelerating a hydrolytic process of residual active sludge generated in the aerating unit by means of high-frequency vibration; and
a settling unit for settling a mixed liquor comprising the active sludge and the sewage discharged from the cell wall breaking unit to enable the active sludge to reflux and discharge inorganic sludge; and
the aerating unit communicates with the settling zone, the cell wall breaking unit communicates with the aerating unit and the settling unit respectively, and the settling unit further communicates with the aerating unit.

Further, a top of the anaerobic zone is provided with a deodorization device, the deodorization device comprising a shell, a protecting layer for preventing water in the anaerobic zone from entering the shell, a physical adsorption layer for physically adsorbing odor floating upwards in the anaerobic zone, a heating assembly for thermal desorption and regeneration of the physical adsorption layer and an exhaust valve for discharging gas adsorbed by the physical adsorption layer to an atmosphere; and the shell is hermetically connected with the anaerobic zone, a bottom of the shell is provided with a ventilating channel, the protecting layer and the physical adsorption layer are received in the shell, the protecting layer is located at the bottom of the shell, the physical adsorption layer is located above the protecting layer, and the exhaust valve is arranged on a top of the shell.

Further, the detection unit includes a COD detector located in an effluent position of the sewage treatment apparatus and used for detecting a COD value of an effluent of the sewage treatment apparatus, the anaerobic zone is internally provided with the lifting pump for introducing sewage into the anaerobic zone, and both the COD detector and the lifting pump are connected with a controller; and the controller is used for controlling a frequency of a frequency converter of the lifting jump according to a detection result of the COD detector; or the detection unit includes COD detectors located in an influent position and a water outlet position of the sewage treatment apparatus and used for detecting a COD value of an influent and a COD value of an effluent of the sewage treatment apparatus, the anaerobic zone is internally provided with the lifting pump for introducing sewage into the anaerobic zone, and both the COD detectors and the lifting pump are connected with a controller; and the controller is used for controlling the frequency of the frequency converter of the lifting jump according to the detection results of the COD detectors.

The detection unit further includes a total phosphorus detector for detecting a content of total phosphorus of an effluent of the sewage treatment apparatus, the sewage treatment apparatus comprises the physical phosphorus removal device for reducing the content of total phosphorus in the sewage by way of physical adsorption and settlement, and both the physical phosphorus removal device and the total phosphorus detector are connected with the controller; and the controller controls the working state of the physical phosphorus removal device according to the detection result of the total phosphorus detector.

Further, the sewage treatment apparatus further includes the chemical phosphorus removal device for adding a reagent into the sewage to reduce the content of total phosphorus in the sewage, the chemical phosphorus removal device comprising a reagent adding pump, and the reagent adding pump being connected with the controller.

Further, the detection unit further includes a dissolved oxygen tester or a redox potentiometer located in the aerobic zone and used for detecting a concentration of dissolved oxygen in the aerobic zone, the apparatus zone is provided with a fan for introducing air into the aerobic zone; and the controller controls a frequency of a frequency converter of the fan according to a detection result of the dissolved oxygen tester or the redox potentiometer.

The detection unit includes an ammonia nitrogen detector located in an effluent position of the sewage treatment apparatus and used for detecting a content of ammonia nitrogen in an effluent of the sewage treatment apparatus, the sewage treatment apparatus comprises a mixed liquor reflux pump for refluxing a mixed liquor in the aerobic zone of the sewage treatment apparatus to the anaerobic zone, and both the ammonia nitrogen detector and the mixed liquor reflux pump are connected with the controller; and the controller controls the working state of the mixed liquor reflux pump according to a detection result of the ammonia nitrogen detector.

The present invention has the beneficial effects that

The sewage treatment apparatus suitable for multi-household domestic sewage treatment integrates the anaerobic zone, the aerobic zone, the settling zone, the sludge reduction zone and the apparatus zone in the external box body to establish an efficient integrated household sewage treatment system in the external box body, and it is only needed to mount a water inlet pipe and a water outlet pipe. The sewage treatment apparatus is small in size, and further can support three mounting modes: overground, buried and semi-buried mounting modes, so that the sewage treatment apparatus is quite convenient to mount and has the advantages of being incapable of generating odors, low in noise, small in occupied area and low in power consumption. The effluent quality after treatment by the sewage treatment apparatus can meet a first grade standard A of Pollutant Discharge Standard of Municipal Sewage Treatment Plant GB18918-2002. Furthermore, the sewage treatment apparatus can detect parameters in a sewage treatment process and control various sewage treatment devices of the sewage treatment apparatus to adjust control parameters based on the detection result, and the sewage treatment apparatus has a stable effluent quality and can achieve automatic adjustment, thereby playing a role in energy conservation and emission reduction.

Besides the abovementioned purposes, characteristics and advantages, the present invention further has other purposes, characteristics and advantages. Further detailed description of the present invention will be made below with reference to drawings.

BRIEF DESCRIPTION OF THE DRAWINGS

The drawings constituting a part of the disclosure are to provide further understanding of the present invention. The schematic embodiment and description thereof are used for explaining the present invention and do not limit the present invention improperly. In the drawings.

DESCRIPTION OF THE DRAWINGS

11, anaerobic zone, 12, aerobic zone, 13, settling zone, 14, sludge reduction zone, 15, disinfection and sterilization zone, 161, detection unit, 162, controller, 163, fan, 164, alarm module, 165, communication module, 166, converter, 167, touch screen, 168, camera, 169, neural network module, 20, remote monitoring computer, 30, mobile terminal, 40, cloud server, 111, shell, 112, protecting layer, 113, physical adsorption layer, 115, heating assembly, 116, exhaust valve, 1111, handle, 121, aeration main pipe, 122, aeration branch pipe, 123, aeration hose, 124, sleeve, 125, fixed bracket, 126, support frame, 131, box body, 132, vertical flow settling assembly, 133, inclined tube settling assembly, 1313, water channel, 1315, slope, 1321, center barrel, 1322, rebounding piece, 1331, supporting pipe, 1332, inclined tube, 1333, partition plate, 1334, lower guide plate, 1335, upper guide plate, 1337, supporting rod, 1338, upper flow port, 1339, lower flow port, 141, aeration unit, 142, cell wall breaking unit, 143, settling unit, 1421, vibration motor and 1422, vibration piece.

DETAILED DESCRIPTION

Detailed description is made on the embodiments of the present invention below in combination with drawings. However, the present invention can be implemented by various different modes defined and covered below.

Figure 1:
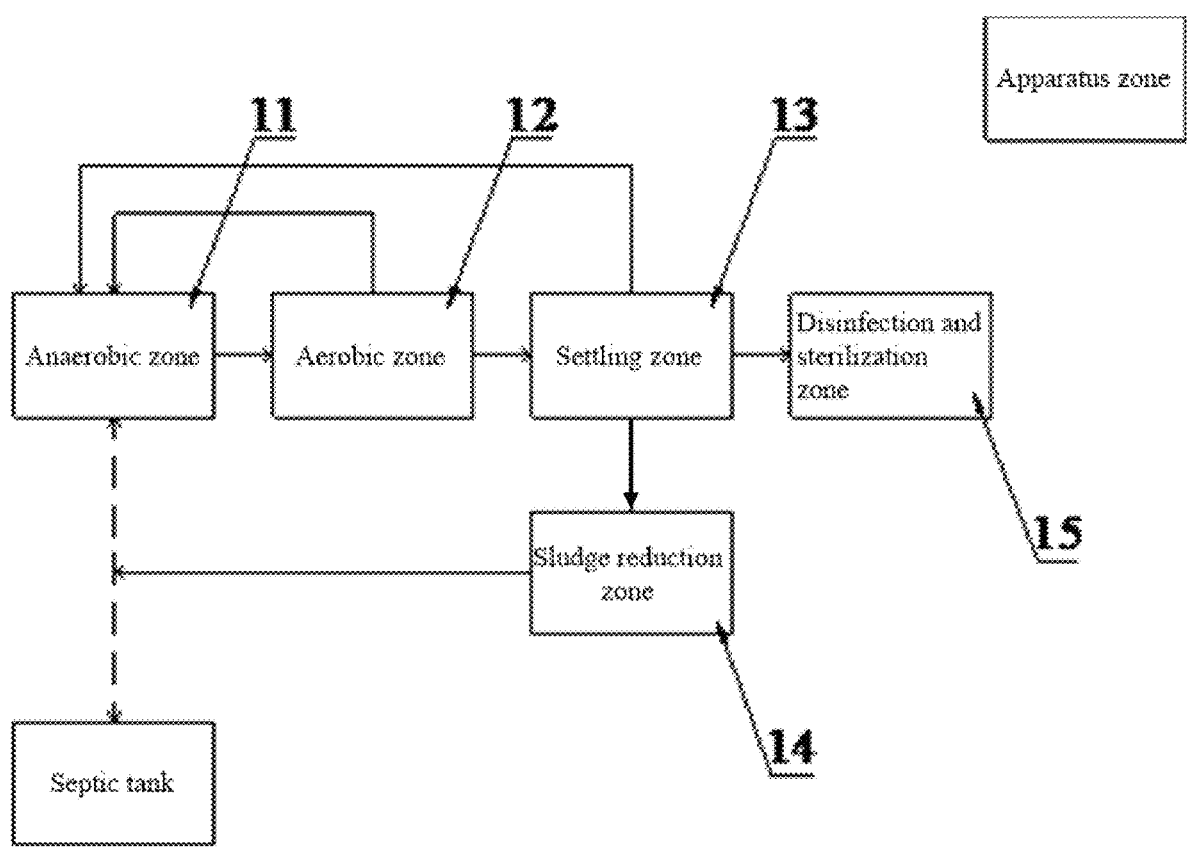
FIG. 1 is a structural schematic diagram of modules of the sewage treatment apparatus suitable for multi-household domestic sewage treatment of a preferred embodiment of the present invention.

As shown in the FIG. 1, the preferred embodiment of the present invention provides a sewage treatment apparatus suitable for multi-household domestic sewage treatment for integrated treatment of household sewage discharged by multiple residences, thereby playing a role of purifying sewage, and the effluent quality is stable. The sewage treatment apparatus is an integrated structure design and includes an external box body, the external box body is internally provided with an anaerobic zone 11, an aerobic zone 12, a settling zone 13, a sludge reduction zone 14 and a disinfection and sterilization zone 15 separated from each other and communicating one another through a pipeline, the anaerobic zone 11, the aerobic zone 12 and the settling zone 13 communicate in sequence, the aerobic zone 12 and the anaerobic zone 11 communicate to return part of mixed liquor to the anaerobic zone 11 so as to manufacture an anaerobic environment in the anaerobic zone 11, the settling zone 13 further communicates with the anaerobic zone 11 to return part of activated sludge to the anaerobic zone 11, the settling zone 13 communicates with the sludge reduction zone 14 and the disinfection and sterilization zone 15 respectively, and the sludge reduction zone 14 further communicates with the anaerobic zone 11 or a septic tank to return an effluent in the sludge reduction zone 14 again to the anaerobic zone 11 or the septic tank for sewage treatment again. It can be understood that the disinfection and sterilization zone 15 can further disinfect clean water discharged from the settling zone 13, thereby further guaranteeing that the effluent quality of the sewage treatment apparatus of the present invention meets the discharge standard. The disinfection and sterilization zone 15 is internally provided with an ultraviolet disinfector and/or an ozone sterilizer, preferably the ultraviolet disinfector. When ultraviolet rays irradiate bacterial bodies in sewage, nucleoproteins and deoxyribonucleic acids of cells absorb emery of the band strongly, and chains thereamong are opened and broken, such that the bacteria are dead. Household sewage discharged by a plurality of residences are introduced into the anaerobic zone 11 after treatment by the septic tank and residue isolating treatment, the anaerobic zone 11 is internally filled with filler, and microorganisms are attached to a filter material of the filler to grow to form a biological film. When the sewage flows through the filter material where the biological film is hung, organic matters in the sewage are diffused to the surface of the biological film and are degraded by the microorganisms in the biological film. The effluent of the anaerobic zone 11 is discharged to the aerobic zone 12, the aerobic zone 12 is internally provided with filler and an aeration system, the sewage in the aerobic zone 12 is subjected to a sufficient biochemical reaction, and part of mixed liquor formed by sufficient reaction of the sewage in the aerobic zone 12 flows into the settling zone 13, and meanwhile, part of mixed liquor is returned to the anaerobic zone 11 via a mixed liquor return pipe to manufacture the anaerobic environment in the anaerobic zone 11. The settling zone 13 can distribute water and settle the mixed liquor uniformly, the effluent in the settling zone 13 flows into the disinfection and sterilization zone 15 and reaches the standard to discharge after disinfection and sterilization, and meanwhile, the settling zone 13 further discharges part of activated sludge which is returned to the anaerobic zone 11. A part of activated sludge and sewage discharged from the settling zone 13 are introduced into the sludge reaction zone 14 for sludge reduction treatment, the sludge reduction zone 14 realizes sludge reduction by way of cell wall breaking, the sludge reduction quantity can reach 60-80%, the effluent of the sludge reduction zone 14 can be then introduced into the anaerobic zone 11 or the septic tank for sewage treatment again, and settlement is carried out to discharge inorganic sludge after sludge reduction treatment. It can be understood that the process that the aerobic zone 12 returns the part of mixed liquor to the anaerobic zone 11 to manufacturer the anaerobic environment in the anaerobic zone 11 is specifically as follows: the mixed liquor is returned to the anaerobic zone 11 via a long distance pipeline, in the long distance conveying process, dissolved oxygen in the mixed liquor is volatilized gradually and is discharged via an exhaust apparatus, the concentration of the dissolved oxygen in the returned mixed liquor is reduced greatly, and a return ratio of the mixed liquor is then controlled to further reduce the concentration of the dissolved oxygen in the anaerobic zone 11, such that a purpose of manufacturing the anaerobic environment in the anaerobic zone 11 is realized.

The sewage treatment apparatus further includes an apparatus zone arranged independently. The apparatus zone is provided with the controller 162, the fan 163 and the detection unit 161, and both the detection unit 161 and the fan 163 are connected with the controller 162. The detection unit 161 can detect parameters in the sewage treatment process, for example, influent and effluent quality of the sewage treatment apparatus or the content of dissolved oxygen in the aerobic zone 12. The controller 162 controls the control parameters of various sewage treatment devices in the sewage treatment apparatus according to the detection result of the detection unit 161 to ensure that the effluent of the sewage treatment apparatus meets the discharge standard, and intelligent control and adjustment is achieved without manual interference, thereby further playing energy-saving and emission-reducing roles. It can be understood that the controller 162 can be a PLC or an MCU.

The sewage treatment apparatus suitable for multi-household domestic sewage treatment integrates the anaerobic zone 11, the aerobic zone12, the settling zone 13, the sludge reduction zone 14 and the disinfection and sterilization zone 15 in the external box body to establish an efficient integrated household sewage treatment system in the external box body, and it is only needed to mount a water inlet pipe and a water outlet pipe. The sewage treatment apparatus is small in size, and further can support three mounting modes: overground, buried and semi-buried mounting modes, so that the sewage treatment apparatus is quite convenient to mount and has the advantages of being incapable of generating odors, low in noise, small in occupied area and low in power consumption. The effluent quality after treatment by the sewage treatment apparatus can meet a first grade standard A of Pollutant Discharge Standard of Municipal Sewage Treatment Plant GB18918-2002. Furthermore, the sewage treatment apparatus can detect parameters in a sewage treatment process and control various sewage treatment devices of the sewage treatment apparatus to adjust control parameters based on the detection result, and the sewage treatment apparatus is stable in effluent quality and can be adjusted automatically, thereby playing energy-saving and emission-reducing roles.

Figure 2:
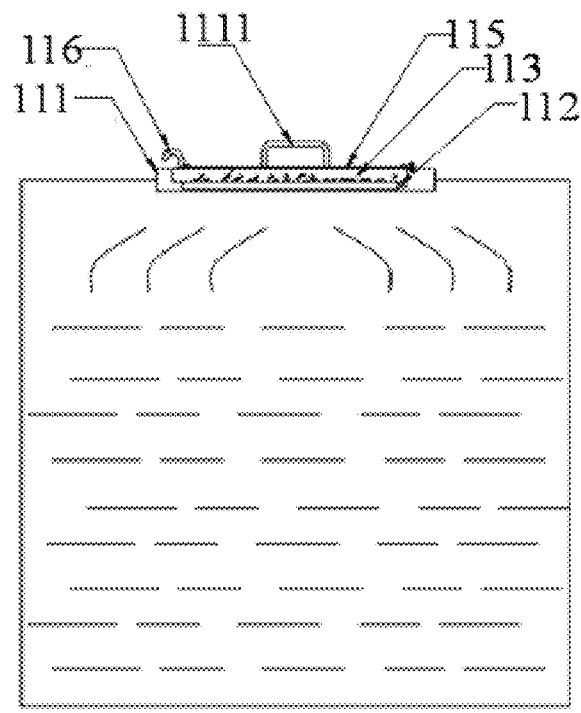
FIG. 2 is a schematic diagram of a deodorization device arranged on the top of the anaerobic zone in the FIG. 1 of the preferred embodiment of the present invention.

As shown in the FIG. 2, the top of the anaerobic zone 11 is provided with the deodorization device for adsorbing and removing gas with odors such as hydrogen sulfide, ammonia gas and fatty acids generated by the sludge in an anaerobic digestion process. It can be understood that the deodorization device and the anaerobic zone 11 jointly form a relatively tight space, and only being deodorized by the deodorization device, can gas in the anaerobic zone 11 be discharged to the atmosphere. The deodorization device includes the shell 111, the protecting layer 112, the physical adsorption layer 113, the heating assembly 115 and the exhaust valve 116, wherein the protecting layer 112 is used for preventing water in the anaerobic zone 11 from entering the shell 111, the physical adsorption layer 113 is used for physically adsorbing an odor floating upwards in the anaerobic zone 11, the heating assembly 115 is used for thermal desorption and regeneration of the physical adsorption layer 113 and the exhaust valve 116 for discharging gas adsorbed by the physical adsorption layer 113 to the atmosphere. The shell 111 is hermetically connected with the anaerobic zone 11, the protecting layer 112 and the physical adsorption layer 113 are accommodated in the shell 111, the bottom of the shell 111 is provided with a ventilating channel to introduce odors generated in the anaerobic zone 11 into the shell 111, the protecting layer 112 is located at the bottom of the shell 111, the physical adsorption layer 113 is arranged on the protecting layer 112, the heating assembly 115 is arranged on the shell 111, and the exhaust valve 116 is arranged on the top of the shell 111 and is located in a position of the physical adsorption layer 113. It can be understood that the ventilating channel at the bottom of the shell 111 can be a vent hole or the bottom of the shell 111 is hollowed out. Odors generated in the anaerobic zone 11 are introduced into the shell 111 through the vent hole in the bottom of the shell 111, pass through the protecting layer 112 and then are adsorbed by the physical adsorption layer 113, and are discharged to the atmosphere via the exhaust value 116. It can be understood that an adsorption material in the physical adsorption layer 113 is activated carbon and the activated carbon can adsorb the odors physically. It can be further understood that pore structures of the activated carbon are mesoporous and macroporous structures mainly, the average bore diameter is 1.5-2.5 nm, preferably 1.5-2 nm, and when the average bore diameter of the porous structure of the activated carbon is within the range, the physical adsorption layer 113 is optimum in physical adsorption effect. The heating assembly 115 is a solar panel which can absorb light energy to heat the physical adsorption layer 113, thereby achieving the thermal desorption and regeneration process of the activated carbon. It can be understood that the heating assembly 115 can be arranged in the shell 111 and the shell 111 in the position of the heating assembly 115 is transparent, and at the moment, the heating assembly 115 is arranged on two sides or around the physical adsorption layer 113. It can be understood that the protecting layer 112 is a semi-transparent film or the protecting layer 112 is a platy piece which is provided with small holes with bore diameters of which being 0.1-0.6 mm, preferably 0.1-0.5 mm. The protecting layer 112 only allows odors floating upwards in the anaerobic zone 11 to enter the shell 111 and blocks sewage in the anaerobic zone 11 out of the shell 111, so as to prevent the sewage from entering the shell 111 to damage an activated carbon adsorption structure of the physical adsorption layer 113 and/or to damage the heating assembly 115.

According to the deodorization device of the present invention, the odors floating upward in the anaerobic zone 11 passes through the protecting layer 112 first, the protecting layer 112 can prevent the sewage in the anaerobic zone 11 from entering the shell 111, the odors physically adsorbed by the physical adsorption layer 113 are then discharged to the atmosphere, the adsorption material of the physical adsorption layer 113 is subjected to thermal desorption and regeneration by the heating assembly 115, the physical adsorption layer 113 can be repeatedly used and still has a good adsorption effect even if being used for a long time, and it is not needed to replace the adsorption material of the physical adsorption layer 113 periodically, such that the operating cost is lowered.

It can be understood that the deodorization device and the anaerobic zone 11 are fixedly connected or detachably connected, wherein detachable connection can be buckling connection, threaded fastening connection, magnetic suction connection or interference fit connection and the like. The shell 111 is further provided with the handle 1111 for the convenience of lifting. Specifically, the handle 1111 is arranged on the top of the shell 111. When the deodorization device is detached from the anaerobic zone 11, it is convenient to lift the deodorization device with hands.

It can be understood that preferably, the deodorization device further includes an exhaust gas treatment apparatus (not shown in the drawing), and the exhaust gas treatment device is used for cleaning exhaust gas generated by thermal desorption and regeneration of the physical adsorption layer 113 to achieve harmless emission of exhaust gas. When the heating assembly 115 absorbs solar energy to heat the physical adsorption layer 113, the activated carbon in the physical adsorption layer 113 realizes thermal desorption and regeneration, and exhaust gas generated in the thermal desorption and regeneration process is introduced into the exhaust gas treatment device via the exhaust valve 116 and is then cleaned and discharged to the atmosphere. For example, the exhaust treatment device is a photocatalytic device which realizes harmless emission of the exhaust gas through photocatalytic decomposition.

It can be understood that preferably, the deodorization device further can realize functions of automatic detection and gas discharge control. The deodorization device further includes the detection device. The exhaust valve 116 is an electromagnetic valve, both the exhaust valve 116 and the detection device are connected with the controller 162, and the controller 162 is further connected with the heating assembly 115 to control the heating assembly 115 to start work. The detection apparatus can detect components of gas adsorbed by the physical adsorption layer 113 and feed the detection result back to the controller 162. Content threshold values of various gas components are preset in the controller 162 according to the discharge standard. When the controllers 162 makes a comparison that the gas components adsorbed by the physical adsorption layer 113 meet the discharge standard, the controller 162 controls the exhaust valve 116 to open and the adsorbed gas is discharged to the atmosphere via the exhaust valve 116. When the controller 162 makes a comparison that the gas components adsorbed by the physical adsorption layer 113 do not the discharge standard, it is verified that the adsorption effect of the physical adsorption layer 113 is reduced greatly and odors cannot be adsorbed physically well. The controller 162 controls the exhaust valve 116 to close, and controls the heating assembly 115 to start work. The activated carbon in the physical adsorption layer 113 is subjected to thermal desorption and regeneration and the exhaust valve 116 communicates with the exhaust gas treatment apparatus, the controller 162 controls the exhaust valve 116 to open, and the exhaust gas generated by thermal desorption and regeneration of the physical adsorption layer 113 and gas in the anaerobic zone 11 are introduced into the exhaust gas treatment apparatus and are discharged to the atmosphere after being cleaned. The detection device is a gas analyzer. The deodorization device of the present invention can achieve automatic detection and intelligent discharge of odors via the detection device and the controller 162, thereby ensuring that the deodorization device has a good deodorization effect.

It can be understood that as a deformation, the heating assembly 115 further can be an electric heating plate or an electric heating tube (not shown in the drawings) for heating the physical adsorption layer 113, the electric heating plate or the electric heating tube is arranged above the physical adsorption layer 113, the electric heating plate can further heat the physical adsorption layer 113 and cooperates with the heating assembly 115 to accelerate the thermal desorption and regeneration process of the physical adsorption layer 113.

Figure 3:
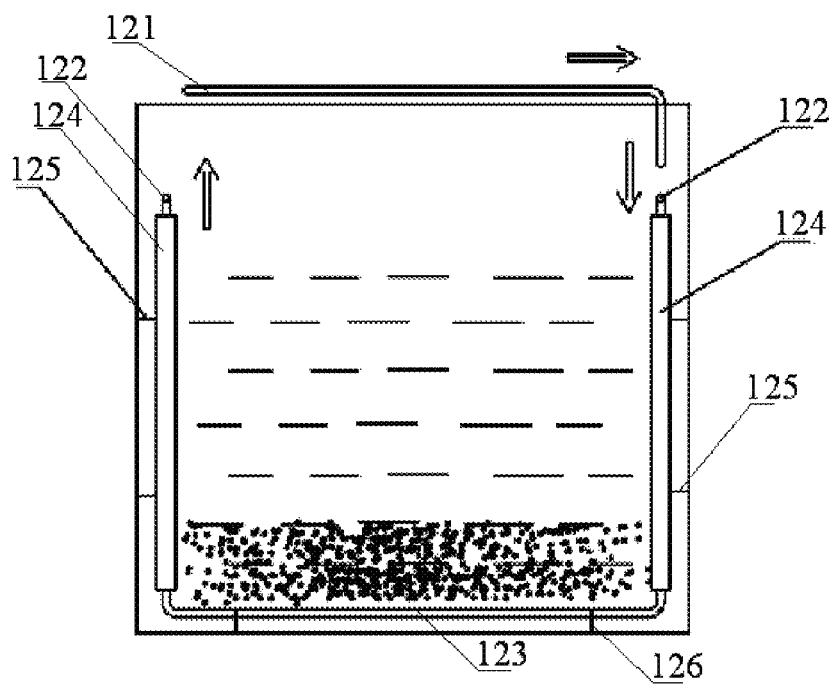
FIG. 3 is a schematic diagram of the aeration device arranged in the aerobic zone in the FIG. 1 of the preferred embodiment of the present invention.

As shown in the FIG. 3, the aerobic zone 12 is internally provided with the aeration device for increasing concentration of dissolved oxygen in the aerobic zone 12. The aeration device includes an aeration main pipe 121, an aeration branch pipe 122, an aeration hose 123, a sleeve 124 and a fixed bracket 125, wherein the aeration main pipe 121 is arranged on two sides of the aerobic zone 12, the aeration hose 123 is arranged at the bottom of the aerobic zone 12, and the aeration hose 123 plays an aerating role. It can be understood that the aeration hose 123 has the characteristics of thin wall and straight channel and can reduce the loss of aerating resistance to a great extent. Aeration holes in the aeration hose are slit shaped, and the widths of the slits are variable, so that a problem that an existing aeration head is easily blocked is solved. The aeration head aerates uniformly, can form a vertical ring current, and is small in generated bubble and high in oxygen utilization ratio. The aeration main pipe 121 communicates with the fan 163 of the apparatus zone, the fixed bracket 125 is fixedly connected with the inner side wall of the aerobic zone 12, the sleeve 124 is fixedly connected with the fixed bracket 125, the sleeve 124 is vertically arranged or obliquely arranged, i.e., the sleeve 124 is perpendicularly arranged or vertically and obliquely arranged, one end of the aeration branch pipe 122 is detachably connected with the aeration main pipe 121, and the other end of the aeration branch pipe 122 penetrates through the sleeve 124 and is detachably connected with the aeration hose 123 at the bottom of the aerobic zone 12. It can be understood that the fixed bracket 125 and the sleeve 124 are arranged on each of opposite two side walls of the aerobic zone 12, and the aeration branch pipe 122 penetrates through the sleeve 124 and is detachably connected with two ends of the aeration hose 123 respectively. It can be understood that the detachable connection mode can be hoop connection and quick connector connection, or one of two connected pipes is provided with a connector of an internal thread structure and the other is provided with a connector with an external thread structure, i.e., the two are connected by thread fit. It can be understood that the aeration main pipe 121 is divided into an air inlet main pipe and an air outlet main pipe, the air inlet main pipe communicates with the fan 163 and the air inlet main pipe is connected with the aeration branch pipe 122 on one side of the aerobic zone 12, the aeration branch pipe 122 on the other side of the aerobic zone 12 communicates with the air outlet main pipe, and air conveyed by the fan 163 circulates in the aerobic zone 12 via the air inlet main pipe, the aeration branch pipe 122 and the aeration hose 123 on one side and the aeration branch pipe 122 and the air outlet main pipe on the other side. It can be understood that the aeration branch pipe 122 is a hose, and the aeration branch pipe 122 and the aeration hose 123 are made from PU or soft PVC. It can be understood that as the aeration branch pipe 122 is the hose, the aeration branch pipe is easy to float when air is introduced into the aeration branch pipe. The aeration branch pipe 122 is limited by the sleeve 124, and the aeration branch pipe 122 vertically arranged can be limited, so that the aeration branch pipe does not swing left and right. In addition, the sleeve 124 further can limit the aeration hose 123 to float upward to a great extent. It can be understood that a plurality of aeration hoses 123 are arranged uniformly at intervals at the bottom of the aerobic zone 12 to ensure uniform aeration. The aeration branch pipes 122 can be arranged in one-to-one correspondence to the aeration hoses 123 or one aeration branch pipe 122 communicates with the aeration hoses 123 via branch pipes respectively. It can be understood that as a deformation, the aeration branch pipe 122 and the aeration hose 123 can be an integrated hose too. It can be further understood that as a deformation, the fixed bracket 125 can be omitted, and the sleeve 124 is fixedly arranged on the inner wall of the aerobic zone 12 directly.

According to the aeration device, when it is needed to replace the aeration hose 123, it is only needed to detach the aeration branch pipe 122 and the aeration main pipe 121 on one side and then to connect the aeration branch pipe 122 with a newly replaced aeration hose 123, and to detach the aeration branch pipe 122 and the aeration main pipe 121 on the other side. The aeration branch pipe 122 is pulled upward uniformly energetically from one end to pull out the aeration hose 123 from the bottom of the aerobic zone 12 along the sleeve 124, and the sleeve 124 plays an important limiting role. Then the newly replaced aeration hose 123 is connected with the aeration branch pipe 122, and then the aeration branch pipe 122 is connected with the aeration main pipe 121, and the aeration hose 123 is replaced without shutdown. It is not needed to swab off water in the apparatus, so that it is quite convenient to replace or maintain.

It can be understood that preferably, sealing structures are arranged in a detachable connecting position of the aeration main pipe 121 and the aeration branch pipe 122 and a detachable connecting position of the aeration branch pipe 122 and the aeration hose 123, and the sealing structures can be seal rings, sealants, waterstop rings, a male and female slot seal fit or a mortise joint fit.

It can be understood that preferably, the aeration device further includes the support frame 126 arranged at the bottom of the aerobic zone 12 and used for supporting the aeration hose 123. The support frame 126 is fixedly arranged at the bottom of the aerobic zone 12 via bolts, the aeration hoses 123 are erected on the support frame 126, and the plurality of aeration hoses are uniformly arranged at intervals, such that the aeration hose 123 can be supported uniformly well. Further, preferably, the support frame 126 has a protecting structure when the aeration hose 123 is replaced. The protecting structure can be structured such that a flexible pad is arranged at an inlet-outlet position of the support frame 126, or a flexible layer is arranged on the surfaces of the support frame 126 and the aeration hose 123, or a contact surface of the support frame 126 and the aeration hose 123 is a cone-shaped surface or a cambered surface, or a part in contact with the support frame 126 and the aeration hose 123 is provided with a roller, a ball or a pin roll to achieve rolling contact therebetween.

It can be understood that as a deformation, the aeration device further includes a limiting piece (not shown in the drawing) fixedly arranged at the bottom of the aerobic zone 12 and used for limiting the aeration hose 123. The limiting piece is fixedly arranged at the bottom of the aerobic zone 12 through screws or bolts, and the limiting piece is provided with a through hole where the aeration hose 123 passes through. As the aeration hose 123 is made from a soft material, the aeration hose is easy to float when air is introduced into the aeration hose, and the limiting piece can limit the aeration hose 123 well, such that the aeration hose 123 is substantially horizontal at the bottom of the aerobic zone 12 and meanwhile, it ensured that air bubbles generated by the aeration hose 123 are in a vertical ascent state substantially and are more uniform to aerate. It can be understood that a plurality of limiting pieces are arranged uniformly at intervals at the bottom of the aerobic zone 12.

It can be further understood that preferably, a fixed position of the fixed bracket 125 can be adjusted on the inner wall of the aerobic zone 12. In particular, the inner wall of the aerobic zone 12 is uniformly provided with a plurality of threaded holes at intervals, the fixed bracket 125 is fastened to the inner wall of the aerobic zone 12 via screws, and a vertical height of the fixed bracket 125 can be adjusted by selecting positions of the threaded holes, such that a horizontal height of the aeration hose 123 can be further adjusted and it is convenient to adjust the height position of the aeration hose 123 according to an actual need. Or, the inner wall of the aerobic zone 12 is vertically provided with a sliding groove, the sliding groove is internally provided with a plurality of positioning salient points at intervals, the fixed bracket 125 is provided with a protrusion, can slide up and down in the sliding groove and is positioned via the positioning salient points in the sliding groove, such that it is quite convenient to adjust the height position of the fixed bracket 125, thereby adjusting the height position of the aeration hose 123.

It can be understood that preferably, the aeration device further includes a sleeving bend (not shown in the drawing) arranged at a connecting position of the aeration branch pipe 122 and the aeration hose 123, one end of the sleeving bend is connected with a sleeve 124 and the end of the aeration hose 123 connected with the aeration branch pipe 122 is located in the sleeving bend. When it is needed to replace the aeration hose 123, the aeration branch pipe 122 is pulled energetically upwards to pull out the aeration hose 123 from the sleeve 124. As the sleeve 124 is arranged vertically or obliquely and the aeration hose 123 is arranged horizontally substantially, the bottom of the sleeve 124 is easy to scratch the aeration hose 123 when the aeration hose 123 is pulled. The aeration hose 123 can be prevented from being scratched as the sleeving bend arranged at a connecting position of the aeration branch pipe 122 and the aeration hose 123. Further, preferably, an inner surface of the sleeving bend is provided with a flexible layer or an inlet-outlet of the sleeving bend is provided with a flexible pad or a surface of the sleeving bend in contact with the aeration hose 123 is a circular conical surface or an arc surface.

Figure 4:
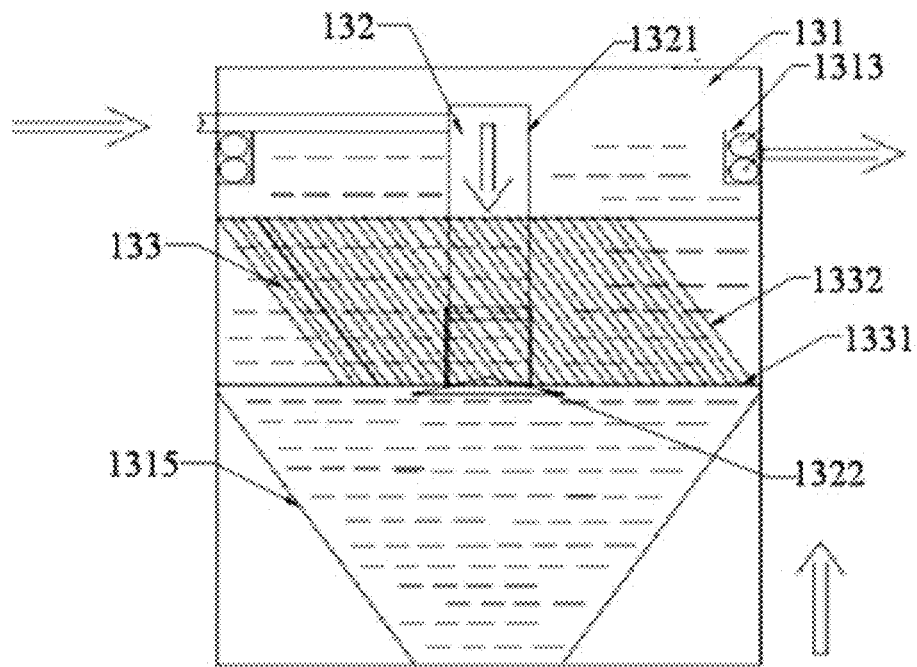
FIG. 4 is a schematic diagram of the water advanced treatment device arranged on the settling zone in the FIG. 1 of the preferred embodiment of the present invention.

As shown in the FIG. 4, the settling zone 13 is provided with the water advanced treatment device for advanced treatment on sewage. The effluent treated by the water advanced treatment device can reach an effluent standard A of first grade of national standard. The water advanced treatment device includes the box body 131, the vertical flow settling assembly 132 and the inclined tube settling assembly 133, and the vertical flow settling assembly 132 and the inclined tube settling assembly 133 are received in the box body 131. The box body 131 is of a closed structure and only communicates with outer side via the water inlet and the water outlet. Specifically, the water inlet and the water outlet are formed in an upper side wall of the box body 131. The water inlet pipe extends into the box body 131 via the water inlet to communicate with the vertical flow settling assembly 132, the vertical flow settling assembly 132 is located in a position of a center axis of the box body 131 and is vertically arranged, and two ends of the vertical flow settling assembly 132 penetrates through the inclined tube settling assembly 133 respectively. The vertical flow settling assembly 132 is used for vertically guiding fluid introduced from the water inlet and outputting the fluid in an ejecting manner by way of inclined wall deflection the inclined tube settling assembly 133 is arranged in an output position of the vertical flow settling assembly 132 and used for settling the fluid output by the vertical flow settling assembly 132 in an inclined settling manner. The inclined tube settling assembly 133 divides a water body into a series of shallow settling layers, and the treated water body and settled sludge move and are separated mutually in each settling shallow layer, so that the inclined tube settling assembly has the advantages of large settling area, high settling efficiency, short settling time and the like. The inner wall of the box body 131 is provided with a ring of water channel 1313, the bottom position of the water channel 1313 is lower than the position of the water outlet, the water outlet pipe communicates with the water outlet, and only can a clean liquid in the uppermost layer settled flow into the water channel 1313 to be discharged via the water discharge pipe, such that it is ensured that the water advanced treatment device has a good settling treatment effect. The water advanced treatment device of the present invention laminates and combines vertical flow settling with inclined tube settling, such that the structural space is saved, and therefore, the whole apparatus is more integrated and miniaturized. It can be understood that as a deformation, the vertical flow settling assembly 132 can be further arranged on one side in the box body 131 and catapult the water flow to the other side via the sloping plate.

The vertical flow settling assembly 132 includes the center barrel 1321 and the rebounding piece 1322 connected with each other, the upper end of the center barrel 1321 can be either closed or opened, the upper portion of the center barrel 1321 communicates with the water inlet pipe, and the rebounding piece 1322 is arranged at the lower end of the center barrel 1321 and is located below the inclined tube settling assembly 133. Sewage introduced from the water inlet pipe passes through the center barrel 1321 and is catapulted to an inclined wall of the inclined tube settling assembly 133 via the rebounding piece 1322 after a freely falling body motion, such that preliminary sludge and sewage separation is achieved. It can be understood that the rebounding piece 1322 is provided with at least one bevel located in a falling direction of sewage. Preferably, the rebounding piece 1322 is isosceles triangle-shaped, and the two waists thereof play a catapulting role on the sewage in freely falling body motion. It can be further understood that the center barrel 1321 can be fixed via a fixed bar (not shown in the drawing), and one end of the fixed bar is connected with the central barrel 1321 while the other end of the fixed bar is connected with the inner wall of the box body 131. In order to guarantee a stable position of the central barrel 1321, preferably, a plurality of fixed bars are circumferentially arranged on the inner wall of the box body 131. It can be further understood that the central barrel 1321 and the rebounding piece 1322 are connected via two connecting rods, and the connecting rods are preferably L-shaped. An inclination angle of the bevel of the rebounding piece 1322 is 10-45 degrees, preferably 10-20 degrees. When the inclination angle of the bevel of the rebounding piece is within the range, the sewage in freely falling body motion in the central barrel 1321 can be uniformly rebounded to the inclined wall of the inclined tube settling assembly 133, such that a preliminary sludge and sewage separation effect is the best. It can be understood that the rebounding piece 1322 further can be an inclined plate, a conical plate or a cone-shaped plate. It can be further understood that the inclination angle of the bevel of the rebounding piece 1322 can be adjusted and the angle of the water flow falling in the central barrel 1321 to the rebounding piece 1322 can be adjusted by adjusting the inclination angle of the bevel of the rebounding piece 1322, so that the rebounding angle of the water flow is further adjusted, and therefore, vertical flow settlement and inclined tube settlement are combined perfectly, thereby ensuring a good settling effect.

It can be understood that as a deformation, an axial length of the center barrel 1321 can be adjusted. Specifically, the center barrel 1321 is of a retractable structure formed by connecting a plurality of barrel bodies. Adjacent two barrel bodies can slide relatively along an axial direction to be positioned, such that the axial length of the center barrel 1321 can be adjusted. The water inlet amount and the height position of the water outlet can be adjusted by adjusting the axial length of the center barrel 1321 with quite convenient operation. An impact force of the water flow in freely falling body motion in the center barrel 1321 to the rebounding piece 1322 can be adjusted by adjusting the height position of the water outlet, such that vertical flow settlement and inclined tube settlement can be combined perfectly. It can be understood that as the height of the center barrel 1321 can be further adjusted. Specifically, the top of the center barrel 1321 is connected with an upper inner wall of the box body 131 via a liftable mechanism, and the height of the center barrel 1321 is adjusted by controlling lift of the lifting mechanism, so that the height positron of the water outlet is further adjusted, and therefore, vertical flow settlement and inclined tube settlement can be combined perfectly.

It can be understood that as a deformation, a separation distance between the center barrel 1321 and the rebounding piece 1322 can be adjusted. Specifically, the outer wall surface of the center barrel 1321 is uniformly provided with a plurality of bayonets at intervals, two connecting rods fixedly connected with the rebounding piece 1322 are clamped into the bayonets on the outer wall surface of the center barrel 1321, and the distance between the rebounding piece 1322 and the center barrel 1321 is adjusted by selecting the positions of the bayonets. The impact force of the water flow in freely falling body motion in the center barrel 1321 to the rebounding piece 1322 can be adjusted by adjusting the separation distance between the center barrel 1321 and the rebounding piece 1322, such that the angle of catapulting the water flow by the rebounding piece 1322 is further adjusted to achieve perfect combination of vertical flow settlement and inclined tube settlement.

Figure 5:
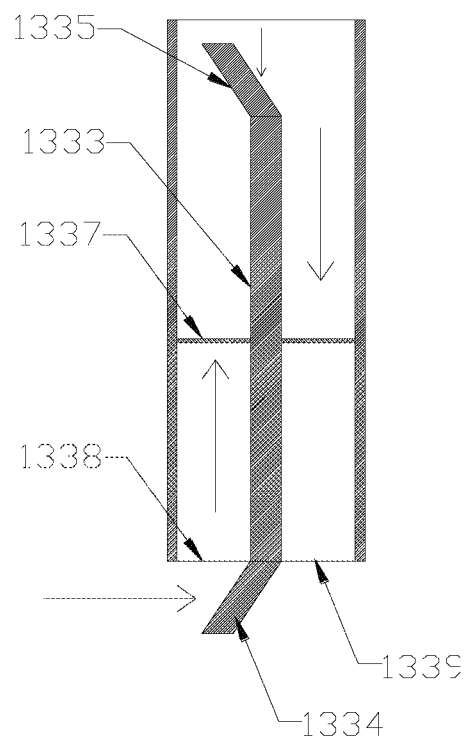
FIG. 5 is a cross-section schematic diagram of the inclined tube in the FIG. 4 of the preferred embodiment of the present invention.

The inclined tube settling assembly 133 includes at least two supporting pipes 1331 and a plurality of inclined tubes 1332 arranged in parallel, the at least two supporting pipes 1331 are fixedly connected with the inner wall of the box body 131 and the plurality inclined tubes 1332 are fixed via the at least two supporting pipes 1331. The inclination angel of the inclined tubes 1332 is 50-70 degrees, preferably 55-60 degrees. When the inclination angel of the inclined tubes 1332 is within the range, the inclined tube settling assembly 133 has the best settling effect. Preferably, the number of the supporting pipes 1331 is two, and one ends of the plurality of inclined tubes 1332 arranged in parallel are connected with one of the supporting pipes 1331 while the other ends of the plurality of inclined tubes are connected with the other supporting pipe 1331. It can be understood that the supporting pipe 1331 is horizontally arranged preferably, and the inclined tube settling assembly 133 is more stable in structure. It can be understood that preferably, the inclined tube 1332 is internally provided with honeycomb filler, such that the settling effect is further improved. It can be understood that the water inlet in the lower end of the inclined tube 1332 and the water outlet in the upper end of the inclined tube can be sealed and adjusted, and specifically, closing degrees of the water inlet in the lower end of the inclined tube 1332 and the water outlet in the upper end of the inclined tube are adjusted by a sealing plate. It can be understood that the inclination angle of the inclined tube 1332 can be adjusted and specifically, the lower end of the inclined tube 1332 is fixedly connected with the supporting pipe 1331, and the upper end of the inclined tube 1332 is movably connected with the supporting pipe 1331; or the upper end of the inclined tube 1332 is movably connected with the supporting pipe 1331 and the upper end of the inclined tube 1332 is fixedly connected with the supporting pipe 1331. The silt deposition speed in the inclined tube 1332 can be adjusted by adjusting the inclination angel of the inclined tube 1332, so that the settling treatment speed is accelerated. It can be further understood that as shown in the FIG. 5, preferably, the water inlet in the lower end of the inclined tube 1332 is internally provided with a partition plate 1333 along an axial direction of the inclined tube, and specifically, the partition plate 1333 is fixed in the inclined tube 1332 through a supporting rod 1337, the partition plate 1333 divides the water inlet of the inclined tube 1332 into the upper flow port 1338 and the lower flow port 1339, the end of the partition plate 1333 located at the water outlet of the inclined tube 1332 is further provided with the lower guide plate 1334, such that the water flow flowing from the vertical flow settling assembly 132 flows into the inclined tube 1332 from the upper flow port 1338 after being guided by the lower guide plate 1334, and in addition, the end of the partition plate 1333 far away from the water inlet is further provided with the upper guide plate 1335, such that settled silt flows out of the inclined tube 1332 from the lower flow port 1339 along the upper guide plate 1335, and therefore, the water flow entering the inclined tube 1332 flows separated from the settled silt flowing out of the inclined tube 1332 to prevent the ascending water flow from bringing the settled silt to the water outlet in the upper end of the inclined tube 1332 again, thereby improving the settling efficiency and the settling effect. It can be further understood that as a deformation, the inclined tube settling assembly 133 can lift integrally relative to the center barrel 1321 along the axial direction, and specifically, two inner side walls of the box body 131 are symmetrically provided with a plurality of groups of bayonets, two ends of the supporting pipe 1331 can be clamped into the bayonets on the two side walls respectively, and the height position of the supporting pipe 1331 can be adjusted by selecting the positions of the bayonets for clamping, such that the height position of the inclined tube 1332 can be adjusted. The angle of the water flow output by the vertical flow settling assembly 132 and catapulted to the inclined wall of the inclined tube settling assembly 133 can be adjusted by adjusting the height position of the inclined tube settling assembly 133 to ensure that preliminary sludge and sewage separation has the best separation effect. It can be understood that preferably, in order to ensure a better dividing effect of the silt and sewage in the inclined tube 1332, the partition plate 1333 is further provided with a movable plate (not shown in the drawing) at the lower flow port 1339, one side of the movable plate is hinged with the partition plate 1333, and the movable plate is wider than the lower flow port 1339 to prevent sewage from entering the inclined tube 1332 from the lower flow port 1339. When the settled silt guided by the upper guide plate 1334 flows into the inclined tube 1332, silt deposited in the inclined tube 1332 will push off the movable plate under the action of gravity, such that the silt is discharged from the lower flow port 1339.

It can be understood that as a deformation, the inclined tube settling assembly 133 in the present invention can be further replaced by a sloping plate settling assembly, sewage is settled and separated in a separation distance between the sloping plate and the sloping plate, and the inclined tube settling assembly 133 and the sloping plate settling assembly adopt inclined settling modes.

Preferably, in order to further improve the sewage treatment effect of the water advanced treatment device, the water advanced treatment device further includes the sand filter layer and/or carbon filter layer arranged in the water channel 1313, and the sand filter layer and/or carbon filter layer filters the water flow in the next step, thereby further improving the sewage treatment effect. The sand filter layer can further remove particulate matters in the sewage, and the carbon filter layer can further adsorb grease in the sewage. Preferably, a water inlet surface of the sand filter layer and/or the carbon filter layer inclines toward an inner cavity of the box body 131, such that filtered impurities subjected to gravity and a washing force of the water flow are returned to the box body 131 to be settled, such that a self-cleaning function of the sand filter layer and/or the carbon filter layer is achieved. It can be understood that as a deformation, the sand filter layer and/or the carbon filter layer can be directly arranged at the water outlet of the box body 131.

Preferably, the inner wall of the lower portion of the box body 131 is provided with a slope 1315, settled sludge slides to the bottom of the box body 131 along the surface of the slope 1315, and by arranging the slope 1315, the sludge settling speed is accelerated and the sludge settling treatment speed is increased. The inclination angle of the slope 1315 is 50-70 degrees, preferably 55-65 degrees. Further, preferably, the bottom of the box body 131 is provided with a sludge discharge port (not shown in the drawing) in a sludge settling region so as to discharge sludge in the box body 131 periodically.

It can be understood that preferably, the water channel 1313 can slide up and down relative to the inner wall of the box body 131, such that a water outlet flow at the water outlet can be adjusted by adjusting the position of the water channel 1313 according to a real-time water level in the box body 131. The water channel 1313 capable of sliding up and down relative to the inner wall of the box body 131 can be structured such that the outer wall of the water channel 1313 is provided with the protrusion, the inner wall of the box body 131 is provided with the groove, and the water channel and the box body slide relatively via the protrusion and the groove. In addition, the groove is internally provided with the plurality of positioning salient points uniformly at intervals along a vertical direction, and the water channel 1313 is positioned via the positioning salient points. It can be further understood that the protrusion can be arranged on the inner wall of the box body 131 and the groove is formed in the outer wall of the water channel 1313.

According to the water advanced treatment device, the sewage is introduced into the center barrel 1321 via the water inlet pipe, conducts a freely falling body motion in the center barrel 1321 and is rebounded to the inclined wall of the inclined tube 1332 via the rebounding piece 1322 to achieve preliminary sludge and sewage separation. The flow rate of the sewage in the box body 131 can be reduced, such that the sewage ascends slowly in the box body 131. The ascending direction of the water flow in the box body 131 is opposite to the settling direction of the particles, and the particles with the ascending speed equal to the settling speed will form a suspension layer in the box body 131, such that the ascending particles are intercepted and filtered, the particles fall onto the bottom of the box body 131 after being settled, a supernate after settling treatment is buffered and transitioned via the water channel 1313 and is then discharged by the water outlet pipe after being finally filtered and screened by the sand filter layer and/or the carbon filter layer in the water channel 1313. The water advanced treatment device of the present invention combines vertical flow settlement with inclined tube settlement and has the advantages of reasonable arrangement form, high impact load resistance and good settling treatment effect, and a concentration of suspended solids of the effluent can reach a type A discharge standard of grade one of national standard.

Figure 6:
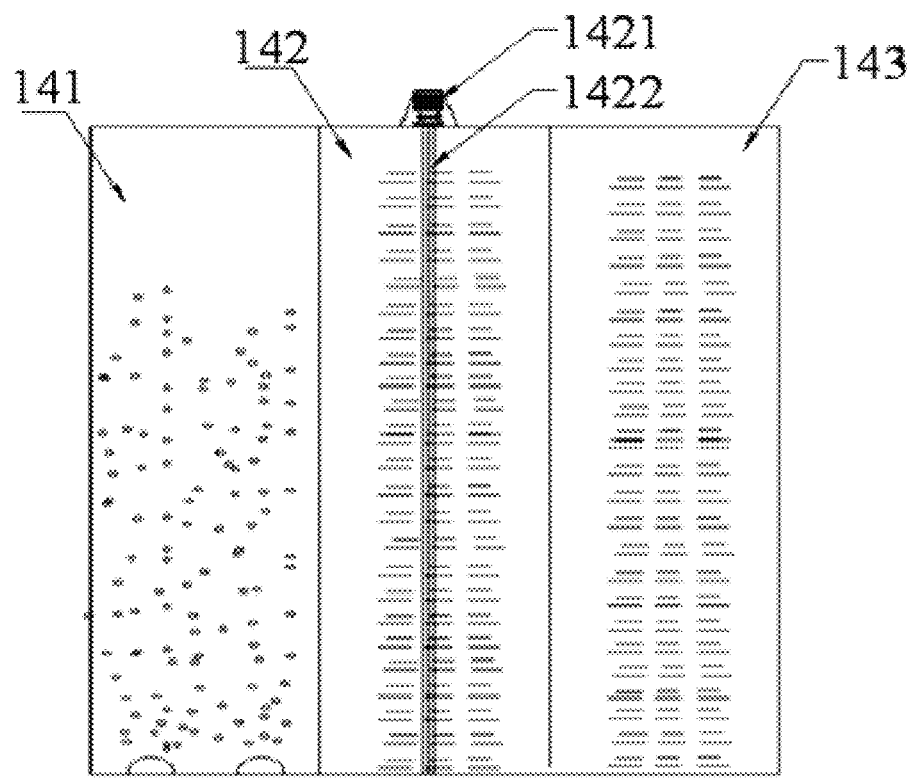
FIG. 6 is a schematic diagram of the sludge reduction arranged in the sludge reduction zone in the FIG. 1 of the preferred embodiment of the present invention.

As shown in the FIG. 6, the sludge reduction zone 14 is internally provided with a sludge reduction device for reduction treatment of sludge in the sewage treatment process. The sludge reduction device includes the aeration unit 141 for enabling active sludge to be mixed and contacted with organic pollutants in the sewage to enable degradation and decomposition of the organic pollutants; the cell wall breaking unit 142 for accelerating the hydrolytic process of residual sludge by means of high-frequency vibration; and the settling unit 143 for settling the sludge from the cell wall breaking unit 142 to enable a part of active sludge to reflux and discharge inorganic sludge; and the cell wall breaking unit 142 communicates with the aerating unit 141 and the settling unit 143 respectively, and the settling unit 143 further communicates with the aerating unit 141. Specifically, the settling unit 143 communicates with the aeration unit 141 via the sludge reflux pipe. It can be understood that the mixed liquor containing the active sludge and the sewage output after settling treatment in the settling zone 13 of a front end sewage treatment step is introduced into the aeration unit 141, and the active sludge is active sludge comprised of microorganisms. The aeration unit 141 is provided with the aeration device, and the aeration device can introduce air into the aeration unit 141, so that the organic pollutants in a pond can be prevented from sinking, the oxygen content in the aeration unit 141 can be increased, and the organic pollutants in the aeration unit 141 and the microorganism active sludge and the dissolved oxygen are enhanced to be fully mixed and contacted, thereby accelerating degradation and absorption of the organic pollutants. The aeration device can be either a surface aeration device or an underwater aeration device. Preferably, the aeration device in the aeration unit 141 is the aeration device in the aerobic zone 12. The cell wall breaking unit 142 can break cell walls for the active sludge via high-frequency vibration, such that water, polysaccharide, fat, proteins and nucleic acids in cells of microorganisms contained in the active sludge are released, thereby accelerating the hydrolytic process of the active sludge. The settling unit 143 settles the mixed liquor containing the active sludge and the sewage discharged from the cell wall breaking unit 142 and refluxes a part of active sludge to the aeration unit 141 and the anaerobic zone 11 so as to supplement a carbon source to the aeration unit 141 and the anaerobic zone 11, the settled inorganic sludge is discharged, and the settled effluent is refluxed to the anaerobic zone 11 or the septic tank for sewage treatment again. For example, polysaccharide, fat, proteins and nucleic acids can be supplemented to the aeration unit 141 as the carbon source without supplementing the carbon source into the aeration unit 141 additionally, thereby lowering the production cost. Furthermore, if the extra carbon source is supplemented into the aeration unit 141, the residual active sludge is increased additionally, such that the sludge reduction load is increased. In addition, the settling unit 143 is refluxed to the active sludge in the aeration unit 141, which can reduce the influent COD value in the aeration unit 141 effectively, thereby improving nitrogen and phosphorus removal effect.

According to the sludge reduction device, the active sludge comprised of microorganisms and the organic pollutants in the sewage are fully mixed and contacted by means of aeration of the aeration unit 141, such that the organic pollutants are degraded and decomposed. Cell walls of the increased active sludge in the aeration unit 141 are broken by means of high-frequency vibration of the cell wall breaking unit 142, such that a lot of water, polysaccharide, fat, proteins and nucleic acids in cells of microorganisms contained in the active sludge are decomposed, and sludge and sewage separation is then conducted via the settling unit 143, most active sludge separated is refluxed to the aeration unit 141 and the anaerobic zone 11, thereby not only supplementing the carbon source to the aeration unit 141 and the anaerobic zone 11 and lowering the cost, but also reducing the influent COD value in the aeration unit 141 and the anaerobic zone 11 effectively, thereby improving the nitrogen and phosphorus removal effect. The sludge reduction device will discharge settled inorganic sludge and refluxes the effluent to the anaerobic zone 11 or the septic tank for sewage treatment again without causing pollution to the environment. The sludge reduction device realizes cyclic use of the residual active sludge and reduces the active sludge effectively, so that the environment is not polluted, the production cost is lowered, the sewage treatment effect is improved, and only settled inorganic sludge is discharged without causing pollution to the environment.

Preferably, the aeration unit 141 is further internally provided with a stirring device for stirring and mixing the active sludge in the aeration unit 141 and the organic pollutants in the sewage to further promote uniform mixing, such that the degradation speed of the organic pollutants is improved.

The cell wall breaking unit 142 is provided with a vibration motor 1421 and a vibration piece 1422 connected with each other, the vibration motor 1421 provides high-frequency vibration, the vibration piece 1422 breaks cell walls for the residual active sludge via high-frequency vibration, such that water, polysaccharide, fat, proteins and nucleic acids in cells of microorganisms contained in the active sludge are released, thereby accelerating the hydrolytic process of the active sludge. The length of the vibration piece 1422 is equivalent to the height of the cell wall breaking unit 142, and cell walls of the residual active sludge can be broken fully. It can be understood that the length of the vibration piece 1422 is not defined specifically and can be adjusted according to an actual need.

It can be understood that preferably, the inner wall of the cell wall breaking unit 142 is further provided with a sound isolating layer to prevent noise generated by high-frequency vibration of the vibration piece 1422 from being spread. It can be understood that preferably, the cell wall breaking unit 142 is further internally provided with a stirring device (not show in the drawing) for stirring the residual active sludge in the cell wall breaking unit 142 so as to improve the cell wall breaking uniformity.

Figure 7:
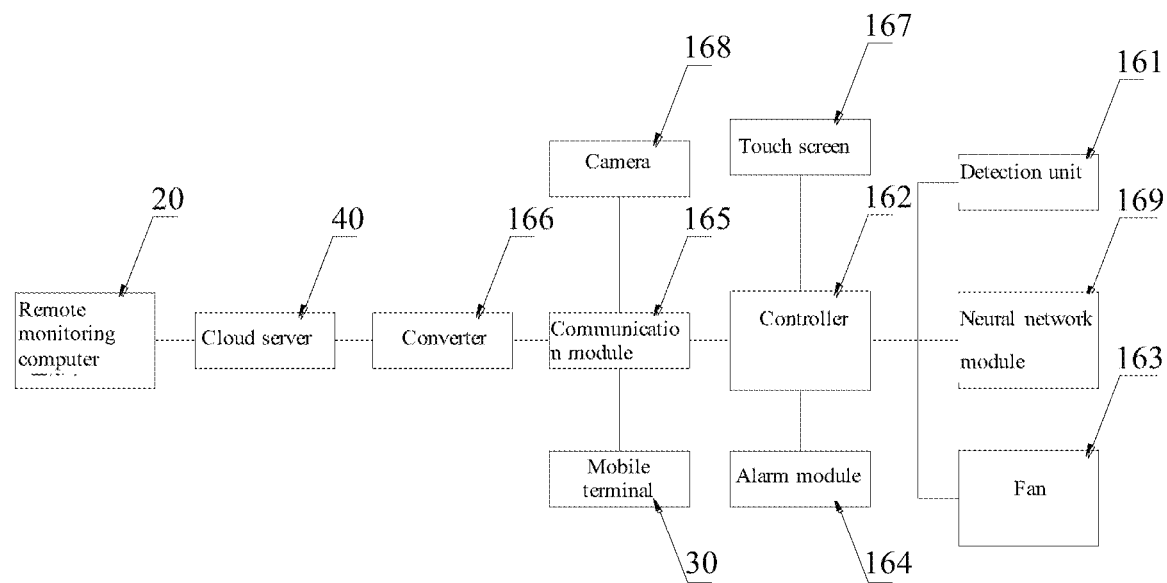
FIG. 7 is a structural schematic diagram of module connection of components such as the controller and fan arranged in the apparatus zone in the FIG. 1 of the preferred embodiment of the present invention.

As shown in the FIG. 7, the apparatus zone is provided with the controller 162, the fan 163 and the detection unit 161, and both the detection unit 161 and the fan 163 are connected with the controller 162. The detection unit 161 can detect parameters in the sewage treatment process, for example, influent and effluent quality of the sewage treatment apparatus or the content of dissolved oxygen in the aerobic zone 12. The controller 162 controls the control parameters of various sewage treatment devices in the sewage treatment apparatus according to the detection result of the detection unit 161 to ensure that the effluent of the sewage treatment apparatus meets the discharge standard, and intelligent control and adjustment is achieved without manual interference, thereby further playing energy-saving and emission-reducing roles. It can be understood that the detection unit 161 includes one or more of a liquid level detector, a flow detector, a dissolved oxygen meter, a total phosphorus detector, a redox potentiometer, an ammonia nitrogen detector and a COD detector. The controller 162 includes a CPU unit which can collect a switching value signal and an analog quantity signal of the detection unit 161, i.e., the CPU unit obtains various monitoring results and working state of the detection unit 161 and judges whether a sewage treatment result meets the standard or not according to the monitoring result, and judges whether the detection unit works normally or not according to the working state. If the CPU unit judges that the sewage treatment result does not meet the standard, the CPU unit operates according to a program loaded in advance and controls the control parameters of various sewage treatment devices according to control signals corresponding to an operation result. When the CPU unit judges that some detection unit 161 fails after collecting the switching value signal of the detection unit 161, the CPU unit generates a fault alarm signal. It can be understood that the controller 162 is a PLC or an MCU. It can be understood that various treatment devices in the sewage treatment apparatus includes a fan 163, a lifting pump, a chemical reagent adding device, a physical phosphorus removal device, a chemical phosphorus removal device, a mixed liquor reflux pump, a second electric control switch element and a carbon source supplementing device and the like.

According to the sewage treatment apparatus, the detection unit 161 monitors various parameters during sewage treatment process and transmits the detection result to the controller 162, the controller 162 adjusts the control parameters of the various sewage treatment devices in the sewage treatment apparatus according to the detection result, and the sewage treatment process achieves functions of automatic detection and automatic adjustment without manual interference. The adjusting process is controlled by the operation program loaded in advance by the controller 162, so that the adjusting accuracy is high, and thereby, ensuring that the sewage treatment apparatus has the optimum sewage treatment effect and improving the sewage treatment efficiency of the sewage treatment apparatus.

It can be understood that preferably, the apparatus zone is further provided with a communication module 165 for transmitting the switching value signal and the analog quantity signal collected by the controller 162 and generated fault alarm signal to a cloud server 40, and the communication module 165 is connected with the controller 162 and the cloud server 40 respectively. Staff can obtain alarm on a remote monitoring computer 20 connected with the cloud server 40, the remote monitoring computer 20 further can conduct configuration remote reading and writing on the switching value signal and the analog quantity signal collected by the controller 162, such that the operating state of the sewage treatment apparatus can be further known under an unattended circumstance on site. Furthermore, the remote monitoring computer 20 can further control the controller 162 remotely via the cloud server 40, so that the apparatus can be controlled to start and stop, set parameters, reset faults and the like. It can be understood that the cloud server 40 can communicate with a plurality of sewage treatment apparatuses simultaneously and the remote monitoring computer 20 can control the plurality of sewage treatment apparatuses simultaneously. It can be understood that the communication mode of the communication module 165 and the cloud server 40 can be one or more of radio communication, optical fiber communication and GPRS communication. The communication module 165 includes one or more of a radio communication module, an optical fiber communication module and a GPRS communication module. It can be understood that further, preferably, the communication module 165 is in further wireless communication connection with the mobile terminal 30, and the controller 162 includes a short message control module, i.e., the controller 162 can support short message reading and writing functions, wherein the short message control module can select a GRM200 type PLC short message control module. After the controller 162 generates the fault alarm signal, alarm information can be sent to the mobile terminal 30 via the communication module 165. Even if staff is not on site or is not in front of the remote monitoring computer 20, the operating condition of the sewage treatment apparatus can be known immediately. After the staff obtains the alarm information by the mobile terminal 30, the working state of the sewage treatment apparatus is controlled by sending information to the communication module 165, then reading and writing the information by the controller 162 and converting the information to a control signal. For example, the sewage treatment apparatus is controlled to start and stop, set related parameters or reset faults and the like by short message reading and writing. It can be understood, the mobile terminal 30 is a mobile phone, a tablet personal computer or a wearable electronic apparatus and the like.

The sewage treatment apparatus can communicate with the cloud server 40 via the communication module 165, the remote monitoring computer 20 can obtain the operating states of the plurality of sewage treatment apparatuses simultaneously by logging the cloud server 40. Furthermore, the plurality of sewage treatment apparatuses can be further controlled remotely via the cloud server 40, so that the sewage treatment apparatus is wider in monitoring range and further meets the demand on development of Internet of things. In addition, the sewage treatment apparatus can further communicate with the mobile terminal 30 wirelessly via the communication module 165 to transmit the alarm information to the mobile terminal 30 in form of short message. Even if staff is not on site or is not in front of the remote monitoring computer 20, the operating condition of the sewage treatment apparatus can be known immediately. The controller 162 further support the short message reading and writing functions, and the staff can control the working state of the sewage treatment apparatus remotely via the mobile terminal 30.

It can be understood that preferably, the apparatus zone is further provided with a converter 166 for increasing a communication distance from the communication module 165 to the cloud server 40 and the converter 166 is connected with the cloud server 40 and the communication module 165 respectively. For example, the converter 166 is an RS232/RS485 converter which can converts an RS232 level to an RS485 level, is longer in transmission distance and increases the communication distance from the communication module 165 to the cloud server 40.

It can be understood that preferably, the apparatus zone is further provided with the alarm module 164 connected with the controller 162 and used for sending out the alarm signal. When the controller 162 detects that the detection unit 161 fails, the alarm module 164 can be controlled to send out the alarm signal, so that the staff on site can find the fault timely to remove faults quickly. The alarm signal can be a sound signal, an optical signal or a combination thereof. Further preferably, the apparatus zone is further provided with a camera 168 connected with the communication module 165 and used for monitoring, the camera 168 can monitor a production environment on site and the operating state of the apparatus and transmit a monitored content to the cloud server 40 via the communication module 165. For example, when the alarm module 164 sends out the alarm signal, the staff can find the alarm signal timely in the remote monitoring computer 20 via the camera 168 to remove faults quickly, and the camera 168 plays an auxiliary monitoring role.

It can be understood that preferably, the apparatus zone is further provided with the touch screen 167 connected with the controller 162 and used for parameter setting and control of the controller 162. The staff can control the sewage treatment apparatus to start and stop, set related parameters or reset faults and the like by the touch screen 167. In addition, the touch screen 167 further can display the detection result of the detection unit 161 and the control parameters of various sewage treatment devices in the sewage treatment apparatus.

It can be understood that the detection unit 161 includes a COD detector located in an effluent position of the sewage treatment apparatus and used for detecting a COD value of an effluent of the sewage treatment apparatus, the anaerobic zone 11 is internally provided with the lifting pump for introducing sewage into the anaerobic zone 11, and the controller 162 adjusts a frequency of a frequency converter of the lifting jump according to a detection result of the COD detector so as to control a rotating speed of the lifting pump, thereby achieving automatic adjustment of the sewage treatment quantity of the sewage treatment apparatus. The controller 162 pre-stores a COD standard value of the effluent. When the controller 162 makes a comparison that the COD standard value of the effluent of the sewage treatment apparatus detected by the COD detector exceeds the standard, it is verified that the sewage treatment quantity of the sewage treatment apparatus exceeds a rated load, and the controller 162 generates a control signal to control reduction of the frequency parameter of the frequency converter of the lifting pump so as to reduce the rotating speed of the lifting pump to reduce the sewage inlet quantity of the sewage treatment apparatus, thereby, the sewage treatment quantity of the sewage treatment apparatus meets the rated load, and the COD value of the effluent meets the standard. For example, it is stipulated by the first grade standard A of Pollutant Discharge Standard of Municipal Sewage Treatment Plant GB18918-2002 that the COD value of the effluent does not exceed 50 mg/L, and when the COD detector detects that the COD value of the effluent exceeds 50 mg/L, the controller 162 controls reduction of the frequency of the frequency converter of the lifting pump, thereby reducing the sage inlet quantity of the sewage treatment apparatus.

It can be understood that preferably, the sewage treatment apparatus includes a reagent adding device which includes a reagent adding pump. The reagent adding device inputs a reagent by the reagent adding pump to reduce the COD value in the sewage, and the controller 162 controls an opening degree of the reagent adding pump according to the detection result of the COD detector so as to control a reagent delivery amount of the reagent adding pump. For example, when the COD detector detects that the COD of the effluent exceeds the standard, the controller 162 controls the rotating speed of the reagent adding pump to increase to increase the reagent delivery amount, so that the COD value of the sewage is reduced quickly and the COD of the effluent reaches the standard as soon as possible; and when the COD detector detects that the COD of the effluent meets the standard, the controller 162 controls the opening degree of the reagent adding pump to decrease to prevent increase of sewage treatment cost due to excessive adding amount of the reagent. The present invention controls reduction of the rotating speed of the reagent adding pump by the controller 162 according to the detection result of the COD detector, thereby not only reducing the COD value of the effluent quickly, but also not increasing the sewage treatment cost. The whole course is controlled automatically without manual interference, so that the adjusting accuracy is high.

It can be understood that when the controller 162 makes a comparison that the COD value of the effluent of the sewage treatment apparatus detected by the COD detector exceeds a standard, the controller 162 generates an alarm control signal which is sent to the cloud server 40 and/or the mobile terminal 30 and/or the alarm module 164 for the convenience of staff to overhaul timely and determine an automatic adjusting result, i.e., determine whether the COD value of the effluent is restored normally or not.

It can be understood that the detection unit 161 further includes a total phosphorus detector for detecting a content of total phosphorus of an effluent of the sewage treatment apparatus, and the sewage treatment apparatus includes the physical phosphorus removal device for reducing the content of total phosphorus in the sewage by way of physical adsorption and settlement. The controller 162 pre-stores a standard value of the content of total phosphorus of the effluent. When the controller 162 makes a comparison that the content of total phosphorus of the effluent of the sewage treatment apparatus detected by the total phosphorus detector exceeds the standard, the controller 162 generates a control signal to control the physical phosphorus removal device to start working to reduce the content of total phosphorus in the sewage, thereby, the content of total phosphorus in the sewage meets the standard. When the total phosphorus detector detects that the content of total phosphorus of the effluent reaches the standard, the total phosphorus detector generates feedback information transmitted to the controller 162, and the controller 162 controls the physical phosphorus removal device to stop working. Compared with an existing phosphorus removal mode, the physical phosphorus removal device has the advantages of high phosphorus removal and quick to feed the phosphorus removal effect. Once the physical phosphorus removal device starts to work, the content of total phosphorus can be reduced immediately. Once the content of total phosphorus of the effluent reaches the standard, the physical phosphorus removal device is controlled to stop working, and therefore, the operating cost is lowered. For example, it is stipulated by the first grade standard A of Pollutant Discharge Standard of Municipal Sewage Treatment Plant GB18918-2002 that the content of total phosphorus of the effluent does not exceed 0.5 mg/L, and when the total phosphorus detector detects that the content of total phosphorus of the effluent exceeds 0.5 mg/L, the controller 162 controls the physical phosphorus removal device to start working, thereby reducing the content of total phosphorus of the effluent of the sewage treatment apparatus. When the total phosphorus detector detects that the content of total phosphorus of the effluent is lower than or equal to 0.5 mg/L, the controller 162 controls the physical phosphorus removal device to stop working.

According to the sewage treatment apparatus, the content of total phosphorus of the effluent of the sewage treatment apparatus is detected by the total phosphorus detector. When the controller 162 makes a comparison that the content of total phosphorus of the effluent of the sewage treatment apparatus detected by the total phosphorus detector exceeds the standard, the controller 162 controls the physical phosphorus removal device to start working to reduce the content of total phosphorus of the effluent, thereby, achieving automatic and quick adjustment of the phosphorus removal process without manual interference. The adjusting process is controlled by the controller 162, so that the adjusting accuracy is high. In addition, compared with an existing phosphorus removal mode, the physical phosphorus removal device has the advantages of high phosphorus removal and quick to feed the phosphorus removal effect. Once the physical phosphorus removal device starts to work, the content of total phosphorus can be reduced immediately. Once the content of total phosphorus of the effluent reaches the standard, the physical phosphorus removal device is controlled to stop working, and the whole adjusting process achieves automatic control, and therefore, the operating cost is lowered.

It can be understood that the physical phosphorus removal device includes a filler cavity for physically adsorbing phosphorus in the sewage and a first electric control switch element arranged at a water inlet of the filler cavity, wherein the first electric control switch element is connected with the controller 162, and the controller 162 controls a sewage delivery amount of the first electric control switch element according to the detection result of the total phosphorus detector. When the total phosphorus detector detects that the total phosphorus of the effluent of the sewage treatment apparatus exceeds the standard, the controller 162 controls the first electric control switch element to be turned on to make the sewage flow into the filler cavity, and the filler cavity physically adsorbing phosphorus in the sewage discharges the sewage to reduce the total phosphorus of the effluent. When the total phosphorus detector detects that the content of total phosphorus of the effluent reaches the standard, the controller 162 then controls the first electric control switch element to be turned off. The first electric control switch element is an electromagnetic valve or an electric control valve, preferably the electromagnetic valve. The controller 162 can control the opening degree of the electric control valve to adjust the sewage delivery amount of the first electric control switch element, thereby achieving precise adjustment. The grain size of filler in the filler cavity is 2-8 mm, preferably 2-5 mm, and when the grain size of the filler is in the range, the filler cavity has the optimum phosphorus removal effect, and the wear rate of filler is low, thereby lowering the maintenance cost of the physical phosphorus removal device. It can be understood that as a deformation, the filler cavity can replace a filler crystallization bed, and phosphorus in the sewage flowing via the first electric control switch element flowing through the filler crystallization bed will be enriched on the surface of filler particles to further generate crystallization and sedimentation, thereby playing a role of reducing the content of total phosphorus in the sewage. It can be further understood that alternatively, the filler cavity can be replaced by an artificial wetland, and an effect of reducing the content phosphorus in the sewage can be achieved as well by filtering, intercepting and depositing phosphorus in the sewage by means of a matrix of the artificial wetland.

Further preferably, the sewage treatment apparatus further includes a backflushing device connected with the controller 162 and used for flushing the physical phosphorus removal device. As the physical phosphorus removal device adsorbs phosphorus in the sewage physically, the phosphorus removal effect of the physical phosphorus removal device will be declined after long time use, and at the time, the controller 162 can control the backflushing device to backflush the physical phosphorus removal device periodically to flush phosphorus adsorbed in the filler cavity, such that the filler cavity keeps a good phosphorus removal effect. It is not needed to replace filler in the filler cavity periodically to ensure the phosphorus removal effect, thereby prolonging the service of the physical phosphorus removal device and lowering the sewage treatment operating cost. As a deformation, an effluent end of the physical phosphorus removal device is provided with a flow monitor connected with the controller 162. When the flow detector detects that the effluent amount of the physical phosphorus removal device is reduced suddenly, the alarm signal is generated and transmitted to the controller 162, and the controller 162 controls the backflushing device to start to backflush the physical phosphorus removal device.

It can be understood that preferably, the sewage treatment apparatus further includes the chemical phosphorus removal device for adding a reagent into the sewage to reduce the content of total phosphorus in the sewage, the chemical phosphorus removal device comprising a reagent adding pump. The chemical phosphorus removal device inputs a phosphorus removal reagent into the sewage via the reagent adding pump, such that phosphate radical seeds in the sewage generates insoluble salt to form a floccule separated from sewage, thereby achieving a phosphorus removal effect. The controller 162 controls the opening degree of the reagent adding pump according to the detection result of the total phosphorus detector so as to control a reagent delivery amount of the reagent adding pump. For example, when the total phosphorus detector detects that the content of total phosphorus of the effluent exceeds the standard, the controller 162 controls the rotating speed of the reagent adding pump to increase to increase the reagent delivery amount, so that the content of total phosphorus of the sewage is reduced quickly and the content of total phosphorus of the effluent reaches the standard as soon as possible; and when the total phosphorus detector detects that the content of total phosphorus of the effluent meets the standard, the controller 162 controls the opening degree of the reagent adding pump to decrease to prevent increase of sewage treatment cost due to excessive adding amount of the phosphorus removal reagent. The present invention controls reduction of the rotating speed of the reagent adding pump by the controller 162 according to the detection result of the total phosphorus detector, thereby not only reducing the content of total phosphorus of the effluent quickly, but also not increasing the sewage treatment cost. The whole course is controlled automatically without manual interference, so that the adjusting accuracy is high.

It can be understood that alternatively, the sewage treatment apparatus further can control the working states of the physical phosphorus removal device and the chemical phosphorus removal device correspondingly according to the content of total phosphorus of the influent. The total phosphorus detector detects the content of total phosphorus of the influent of the sewage treatment apparatus, the controller 162 pre-stores a first threshold value and a second threshold value of the content of total phosphorus of the influent, the content of total phosphorus of the influent is smaller than or equal to the first threshold value, which means the current working state of the sewage treatment apparatus can guarantee that the content of total phosphorus of the effluent meets the standard and is still in the phosphorus removal range of the current working state of the sewage treatment apparatus; the content of total phosphorus of the influent is between the first threshold value and the second threshold value, which means the current working state of the sewage treatment apparatus cannot reduce the content of total phosphorus of the effluent and cannot meet the discharge standard, the content of total phosphorus of the influent exceeds the phosphorus removal range of the current working state of the sewage treatment apparatus, and it is needed to reduce the content of total phosphorus of the effluent by means of other phosphorus removal modes; the content of total phosphorus of the influent is greater than or equal to the second threshold value, which means the content of total phosphorus of the influent exceeds the standard severely, the content of total phosphorus of the influent exceeds the phosphorus removal range of the current working state of the sewage treatment apparatus severely, and it is needed to reduce the content of total phosphorus of the effluent by means of a powerful phosphorus removal mode. When the content of total phosphorus of the influent is blow the first threshold value, the controller 162 controls the physical phosphorus removal device and the chemical phosphorus removal device to be in closed states. When the total phosphorus detector detects that the content of total phosphorus of the influent is between the first threshold value and the second threshold value, the controller 162 controls the physical phosphorus removal device to start working. When the total phosphorus detector detects that the content of total phosphorus of the influent exceeds the second threshold value, the controller 162 controls the chemical phosphorus removal device to start working. For example, when it is detected that the total phosphorus of the influent is below 3 mg/L, a sewage treatment system of the sewage treatment apparatus can reduce the content of total phosphorus in the sewage, so that the effluent can meet the discharge standard. When it is detected that total phosphorus of the influent is 3-6 mg/L, it means the content of total phosphorus of the effluent treated by the sewage treatment system of the sewage treatment apparatus exceeds the discharge standard. The controller 162 controls the physical phosphorus removal device to start working and reduces the content of total phosphorus in the sewage by way of physical adsorption and settlement to meet the discharge standard; when it is detected that total phosphorus of the influent is 6-9 mg/L, it means even if the physical phosphorus removal device starts to work, the content of total phosphorus in the sewage cannot be reduced to below a standard value, and at the time, the controller 162 controls the physical phosphorus removal device to start working and reduces the content of total phosphorus in the sewage by way of chemical adsorption and settlement to meet the discharge standard. It can be understood that as the physical phosphorus removal device removes phosphorus by way of physical adsorption and settlement with a limited phosphorus removal amount. When the content of the total phosphorus of the influent exceeds a certain threshold value, the physical phosphorus removal device cannot reduce the content of total phosphorus below the standard value, and the chemical phosphorus removal device removes phosphorus chemically by inputting a chemical reagent. When the content of total phosphorus of the influent exceeds the standard severely, the phosphorus removal effect of the chemical phosphorus removal device is better than that of the physical phosphorus removal device. The sewage treatment apparatus of the present invention controls the working states of the physical phosphorus removal device and the chemical phosphorus removal device correspondingly according to the detection result of the total phosphorus detector, combines the characteristic that the physical phosphorus removal device can remove phosphorus quickly and is limited in phosphorus removal amount and the characteristic that the chemical phosphorus removal device is large in phosphorus removal amount but is high in phosphorus removal cost and slow in feedback of the phosphorus removal effect, thereby not only ensuring that the content of total phosphorus of the effluent meets the discharge standard, but also lowering the production cost. The whole course is controlled automatically without manual interference, and therefore, it is ensured that the sewage treatment apparatus has a good phosphorus removal effect.

It can be understood that the detection unit 161 includes an ammonia nitrogen detector located in an effluent position of the sewage treatment apparatus and used for detecting a content of ammonia nitrogen in an effluent of the sewage treatment apparatus, the sewage treatment apparatus includes a mixed liquor reflux pump for refluxing mixed liquor in the aerobic zone 12 of the sewage treatment apparatus to the anaerobic zone 11. The controller 162 pre-stores a standard value of the content of ammonia nitrogen of the effluent. When the controller 162 makes a comparison that the content of ammonia nitrogen of the effluent of the sewage treatment apparatus detected by an ammonia nitrogen detector exceeds the standard, the controller 162 generates a control signal to control the mixed liquor reflux pump to start working to reflux the mixed liquor in the aerobic zone 12 to the anaerobic zone 11 for denitrification again so as to reduce the content of ammonia nitrogen in the sewage, thereby, the content of ammonia nitrogen in the sewage meets the standard. When the ammonia nitrogen detector detects that the content of ammonia nitrogen of the effluent reaches the standard, the ammonia nitrogen detector generates feedback information transmitted to the controller 162, and the controller 162 controls the mixed liquor reflux pump to stop working. For example, it is stipulated by the first grade standard A of Pollutant Discharge Standard of Municipal Sewage Treatment Plant GB18918-2002 that the content of ammonia nitrogen of the effluent does not exceed 5(8)/L, and when the ammonia nitrogen detector detects that the content of ammonia nitrogen of the effluent exceeds 5(8)/L, the controller 162 controls the mixed liquor reflux pump to start working, thereby reducing the content of ammonia nitrogen of the effluent of the sewage treatment apparatus. When the ammonia nitrogen detector detects that the content of ammonia nitrogen of the effluent is lower than or equal to 5(8)/L, the controller 162 controls the mixed liquor reflux pump to stop working.

It can be understood that the controller 162 adjusts the rotating speed of the mixed liquor reflux pump by controlling the frequency of the frequency converter of the mixed liquor reflux pump, thereby adjusting a reflux amount of the mixed liquor. It can be understood that when the controller 162 makes a comparison that the content of ammonia nitrogen of the effluent of the sewage treatment apparatus detected by the ammonia nitrogen detector exceeds a standard, the controller 162 generates an alarm control signal which is sent to the cloud server 40 and/or the mobile terminal 30 and/or the alarm module 164 for the convenience of staff to overhaul timely and determine an automatic adjusting result, i.e., determine whether the content of ammonia nitrogen of the effluent is restored normally or not and whether the apparatus operates normally or not. It can be further understood that the controller 162 can control a mixed liquor reflux ratio according to the detection result of the ammonia nitrogen detector, for example, when the ammonia nitrogen detector detects that the content of ammonia nitrogen of the effluent is in a first range, the controller 162 controls the mixed liquor reflux ratio to be 100%; when the ammonia nitrogen detector detects that the content of ammonia nitrogen of the effluent is in a second range, the controller 162 controls the mixed liquor reflux ratio to be 200%; when the ammonia nitrogen detector detects that the content of ammonia nitrogen of the effluent is in a third range, the controller 162 controls the mixed liquor reflux ratio to be 300%; and when the ammonia nitrogen detector detects that the content of ammonia nitrogen of the effluent is in a fourth range, the controller 162 controls the mixed liquor reflux ratio to be 400%, wherein numerical values of the first, second, third and fourth ranges are increased in sequence. Specifically, the aerobic zone 12 communicates with the anaerobic zone 11 via a plurality of mixed liquor reflux pipes, each of the mixed liquor reflux pipes is provided with an electromagnetic valve, and the controller 162 controls the mixed liquor reflux ratio by controlling the rotating speed of the mixed liquor reflux pump and/or the opening quantity of the electromagnetic valves. Namely, each range of the content of ammonia nitrogen of the effluent corresponds to one mixed liquor reflux ratio. The sewage treatment apparatus of the present invention can switch gears automatically based on the content of ammonia nitrogen of the effluent detected, so that the different mixed liquor reflux ratios can be controlled to achieve automatic adjustment, thereby ensuring that the sewage treatment apparatus has a good ammonia nitrogen removal effect.

It can be understood that as a deformation, the aerobic zone 12 and the anaerobic zone 11 of the sewage treatment apparatus communicate via the plurality of reflux pipes, each reflux pipe is provided with a second electric control switch element for controlling the mixed liquor reflux amount, and the second electric control switch element is connected with the controller 162. When the ammonia nitrogen detector detects that the content of ammonia nitrogen of the effluent reaches the standard, the controller 162 then controls the second electric control switch element to be turned off so as to reflux the mixed liquor in the aerobic zone 12 to the anaerobic zone 11. The controller 162 can control the quantity of a plurality of second electric control switch elements, thereby adjusting the reflux amount of the mixed liquor refluxing from the aerobic zone 12 to the anaerobic zone 11 precisely. It can be further understood that the controller 162 can be further used to control the mixed liquor reflux pump and the second electric control switch element to adjust the reflux amount of the mixed liquor simultaneously, so that it is more diverse to adjust and it is more precise too. The second electric control switch element can be an electromagnetic valve or an electric control valve, preferably the electric control valve. The controller 162 can control the opening degree of the electric control valve to adjust the mixed liquor reflux amount of the second electric control switch element, thereby achieving precise adjustment.

It can be understood that preferably, the sewage treatment apparatus includes the mixed liquor reflux pump and the second electric control switch element. The detection unit 161 further includes a flow detector for detecting the mixed liquor reflux amount, and the flow detector is connected with the controller 162. The flow detector can detect the reflux amount of the mixed liquor and generate the feedback signal and transmit the same to the controller 162, the controller 162 stores different mixed liquor reflux amount preset values corresponding to different control parameters of the second electric control switch element and the mixed liquor reflux pump, when the controller 162 makes a comparison that the reflux amount of the mixed liquor detected by the flow detector is lower than a preset value, the controller 162 controls the alarm module 164 to send out alarm or transmits the alarm to the cloud server 40 or the mobile terminal 30 to remind the staff maintaining the second electric control switch element and the mixed liquor reflux pump so as to prevent a condition that the content of ammonia nitrogen in the sewage cannot be reduced as the reflux amount of the mixed liquor is few as the reflux pipe and the mixed liquor reflux pump are blocked. It can be understood that further preferably, when the reflux amount of the mixed liquor detected by the flow detector is lower than the preset value, the controller 162 controls the backflushing device to backflush the mixed liquor reflux pump and the second electric control switch element, thereby preventing a condition that the content of ammonia nitrogen of the effluent is high as the reflux amount of the mixed liquor is smaller and even the mixed liquor cannot be refluxed as a result of blockage.

Carbon sources in the anaerobic zone 11 are consumed continuously along with continuous denitrification, and therefore, new carbon sources are supplemented continuously into the anaerobic zone 11 to ensure smooth denitrification. It can be understood that preferably, the sewage treatment apparatus further includes a carbon source supplementing device (not shown in the drawing), and the carbon source supplementing device includes a reagent adding pump. The carbon source supplementing device supplements new carbon sources into the anaerobic zone 11 via the reagent adding pump, and the controller 162 controls the opening degree of the reagent adding pump according to the detection result of the ammonia nitrogen detector so as to control a reagent delivery amount of the reagent adding pump. It can be understood that the carbon source can be methanol, ethanol, acetic acid, sodium acetate and the like. For example, when the ammonia nitrogen detector detects that the content of ammonia nitrogen of the effluent exceeds the standard, the controller 162 controls the opening degree of the reagent adding pump to be increased or the reagent adding pump to be fully opened, so that the content of ammonia nitrogen of the sewage is reduced quickly and the content of ammonia nitrogen of the effluent reaches the standard as soon as possible; and when the ammonia nitrogen detector detects that the content of ammonia nitrogen of the effluent meets the standard, the controller 162 controls the opening degree of the reagent adding pump to decrease to prevent increase of sewage treatment cost due to excessive adding amount of the reagent. The present invention controls reduction of the opening degree of the reagent adding pump by the controller 162 according to the detection result of the ammonia nitrogen detector, thereby not only reducing the content of ammonia nitrogen of the effluent quickly, but also not increasing the sewage treatment cost. The whole course is controlled automatically without manual interference, so that the adjusting accuracy is high.

An anaerobic condition must be kept in the anaerobic zone 11, and usually, the concentration of dissolved oxygen does not exceed 0.5 mg/L, otherwise denitrification in the anaerobic zone 11 will be destroyed, leading to great reduction of nitrogen removal effect. It can be understood that preferably, the detection unit 161 further includes a dissolved oxygen tester or a redox potentiometer (not shown in the drawing) located in the anaerobic zone 11 and used for detecting a concentration of dissolved oxygen in the anaerobic zone 11, and the dissolved oxygen tester or the redox potentiometer is provided with the controller 162. When the dissolved oxygen tester or the redox potentiometer detects that the concentration of the dissolved oxygen in the anaerobic zone 11 exceeds the standard, the dissolved oxygen tester generates the alarm signal and transmits the same to the controller 162, the controller 162 controls the alarm module 164 to send out alarm, or generate the alarm information and transmits the same to the cloud server 40 and the mobile terminal 30 to remind the staff repairing timely.

It can be understood that preferably, the detection unit 161 further includes a dissolved oxygen tester or a redox potentiometer located in the aerobic zone 12 and used for detecting a concentration of dissolved oxygen in the aerobic zone 12, the controller 162 controls the frequency of the frequency converter of the fan 163 according to the dissolved oxygen tester or the redox potentiometer to adjust the rotating speed of the fan 163 so as to adjust the aeration amount in the aerobic zone 12 automatically, thereby obtaining an intelligent control and energy-saving effect.

It can be understood that preferably, the apparatus zone is further provided with a neural network module 169 connected with the controller 162, and the neural network module 169 is used for deep learning to achieve intelligent control based on the switching value signal and the analog quantity signal collected by the controller 162 and the control signal transmitted, by the controller 162, to various sewage treatment devices. The control signal transmitted, by the controller 162, to various sewage treatment devices is set parameter of the various sewage treatment devices. It can be further understood that the neural network module 169 is a neuron chip. By arranging the neural network module 169, the optimum parameter setting can be obtained by deep learning and the optimum parameter is transmitted to various sewage treatment devices via the controller 162 respectively to achieve intelligent control without debugging or troubleshooting the sewage treatment apparatus manually. Furthermore, with operation of the sewage treatment apparatus, more and more basic data is obtained by the neural network module 169, the deep learning result is more and more precise and the control accuracy is higher and higher.

According to the sewage treatment apparatus suitable for multi-household domestic sewage treatment of the prevent invention, a treatment object is common household sewage, the COD of the influent is 200-300 mg/L, the BOD is 100-120 mg/L, the SS is 80-100 mg/L, the content of ammonia nitrogen is 20-25 mg/L and the content of total phosphorus is 1-3 mg/L. The effluent quality treated by the sewage treatment apparatus of the present invention meets the first grade standard A of Pollutant Discharge Standard of Municipal Sewage Treatment Plant GB18918-2002, wherein the COD of the effluent is 50 mg/L, the BOD is 10 mg/L, the SS is 10 mg/L, the content of ammonia nitrogen is 5 (8) mg/L and the content of total phosphorus is 0.5 mg/L.

The foregoing is merely illustrative of the preferred embodiments of the present invention and is not intended to be limiting of the present invention, and for those skilled in the art, the present invention may have various changes and modifications. Any modification, equivalent replacement, improvement, etc. made within the spirit and principle of the present invention shall be regarded as within the protection scope of the present invention.

We claim:

1. A sewage treatment apparatus for domestic sewage treatment,
    comprising an external box body, the external box body being internally provided with an anaerobic zone, an aerobic zone, a settling zone, a sludge reduction zone and an apparatus zone separated from each other and communicating with one another through a pipeline, wherein
    the anaerobic zone, the aerobic zone, the settling zone and the sludge reduction zone communicate in sequence, the anaerobic zone communicates with a septic tank, the aerobic zone communicates with the anaerobic zone to reflux a part of mixed liquid to the anaerobic zone, the settling zone communicates with the anaerobic zone to reflux a part of active sludge to the anaerobic zone, and the sludge reduction zone communicates with the anaerobic zone or the septic tank; and
    the apparatus zone is internally provided with a detection unit for detecting various parameters during a sewage treatment process and a controller for controlling working states of various sewage treatment devices of the sewage treatment apparatus according to a detection result of the detection unit, and the sewage treatment device comprises one or more of: a fan, a lifting pump, a chemical reagent adding device, a physical phosphorus removal device, a chemical phosphorus removal device, a mixed liquid reflux pump, a second electric control switch element and a carbon source supplementing device, wherein the physical phosphorus removal device includes a filler cavity for physically adsorbing phosphorus in the sewage and a first electric control switch element arranged at a water inlet of the filler cavity, wherein the first electric control switch element is connected with the controller, and the controller controls a sewage delivery amount of the first electric control switch element according to the detection result of the total phosphorus detector; and
    the settling zone is provided with a water advanced treatment device comprising a box body, an upper portion of the box body being provided with a water inlet and a water outlet; and the box body is internally provided with a vertical flow settling assembly for vertically guiding fluid introduced from the water inlet and outputting the fluid in an ejecting manner by way of inclined wall deflection and an inclined tube settling assembly or a sloping plate settling assembly arranged in an output position of the vertical flow settling assembly and used for settling the fluid output by the vertical flow settling assembly in an inclined settling manner.

2. The sewage treatment apparatus according to claim 1, wherein
    the external box body is further internally provided with a disinfection and sterilization zone communicating with the settling zone and used for further disinfecting and sterilizing clean water discharged by the settling zone.

3. The sewage treatment apparatus according to claim 1, wherein
    the sludge reduction zone is provided with a sludge reduction device comprising:
    an aerating unit for enabling active sludge composed of microorganisms to be mixed and contacted with organic pollutants in sewage by aeration to enable degradation of the organic pollutants;
    a cell wall breaking unit for accelerating a hydrolytic process of residual active sludge generated in the aerating unit by means of high-frequency vibration; and
    a settling unit for settling a mixed liquid comprising the active sludge and the sewage discharged from the cell wall breaking unit to enable the active sludge to reflux and discharge inorganic sludge; and
    the aerating unit communicates with the settling zone, the cell wall breaking unit communicates with the aerating unit and the settling unit respectively, and the settling unit further communicates with the aerating unit.

4. The sewage treatment apparatus according to claim 1, wherein
    a top of the anaerobic zone is provided with a deodorization device, the deodorization device comprising a shell, a protecting layer for preventing water in the anaerobic zone from entering the shell, a physical adsorption layer for physically adsorbing an odor floating upwards in the anaerobic zone, a heating assembly for thermal desorption and regeneration of the physical adsorption layer and an exhaust valve for discharging gas adsorbed by the physical adsorption layer to an atmosphere; and
    the shell is hermetically connected with the anaerobic zone, a bottom of the shell is provided with a ventilating channel, the protecting layer and the physical adsorption layer are received in the shell, the protecting layer is located at the bottom of the shell, the physical adsorption layer is located above the protecting layer, and the exhaust valve is arranged on a top of the shell.

5. The sewage treatment apparatus according to claim 1, wherein
    the detection unit comprises a COD detector located in an effluent position of the sewage treatment apparatus and configured to detect a COD value of an effluent of the sewage treatment apparatus, the anaerobic zone is internally provided with the lifting pump for introducing sewage into the anaerobic zone, and both the COD detector and the lifting pump are connected with a controller; and the controller is configured to control a frequency of a frequency converter of the lifting jump according to a detection result of the COD detector; or
    the detection unit comprises COD detectors located in an influent position and a water outlet position of the sewage treatment apparatus and configured to detect a COD value of an influent and a COD value of an effluent of the sewage treatment apparatus, the anaerobic zone is internally provided with the lifting pump for introducing sewage into the anaerobic zone, and both the COD detectors and the lifting pump are connected with a controller; and the controller is configured to control the frequency of the frequency converter of the lifting jump according to the detection result of the COD detectors.

6. The sewage treatment apparatus according to claim 1, wherein the detection unit further comprises a total phosphorus detector for detecting a content of total phosphorus of an effluent of the sewage treatment apparatus, the sewage treatment apparatus comprises the physical phosphorus removal device for reducing the content of total phosphorus in the sewage by way of physical adsorption and settlement, and both the physical phosphorus removal device and the total phosphorus detector are connected with the controller; and the controller controls the working state of the physical phosphorus removal device according to the detection result of the total phosphorus detector.

7. The sewage treatment apparatus according to claim 6, further comprising the chemical phosphorus removal device for adding a reagent into the sewage to reduce the content of total phosphorus in the sewage, wherein the chemical phosphorus removal device comprises a reagent adding pump, and the reagent adding pump is connected with the controller.

8. The sewage treatment apparatus according to claim 1, wherein the detection unit further comprises a dissolved oxygen tester or a redox potentiometer located in the aerobic zone and configured to detect a concentration of dissolved oxygen in the aerobic zone, the apparatus zone is provided with a fan for introducing air into the aerobic zone; and the controller controls a frequency of a frequency converter of the fan according to a detection result of the dissolved oxygen tester or the redox potentiometer.

9. The sewage treatment apparatus according to claim 1, wherein the detection unit comprises an ammonia nitrogen detector located in an effluent position of the sewage treatment apparatus and configured to detect a content of ammonia nitrogen in an effluent of the sewage treatment apparatus, the sewage treatment apparatus comprises a mixed liquid reflux pump for refluxing mixed liquid in the aerobic zone of the sewage treatment apparatus to the anaerobic zone, and both the ammonia nitrogen detector and the mixed liquid reflux pump are connected with the controller; and the controller controls the working state of the mixed liquid reflux pump according to a detection result of the ammonia nitrogen detector.

\* \* \* \* \*